(12) United States Patent
Kim et al.

(10) Patent No.: US 12,501,483 B2
(45) Date of Patent: Dec. 16, 2025

(54) METHOD AND DEVICE FOR UPDATING PARAMETERS IN COMMUNICATION SYSTEM SUPPORTING MULTI-LINK

(71) Applicants: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

(72) Inventors: Yong Ho Kim, Incheon (KR); Han Seul Hong, Seoul (KR)

(73) Assignees: HYUNDAI MOTOR COMPANY, Seoul (KR); KIA CORPORATION, Seoul (KR); KOREA NATIONAL UNIVERSITY OF TRANSPORTATION INDUSTRY—ACADEMIC COOPERATION FOUNDATION, Chungju-si (KR)

( * ) Notice: Subject to any disclaimer, the term of this patent is extended or adjusted under 35 U.S.C. 154(b) by 490 days.

(21) Appl. No.: 17/915,944

(22) PCT Filed: Mar. 25, 2021

(86) PCT No.: PCT/KR2021/003732
§ 371 (c)(1),
(2) Date: Sep. 29, 2022

(87) PCT Pub. No.: WO2021/201504
PCT Pub. Date: Oct. 7, 2021

(65) Prior Publication Data
US 2023/0164831 A1    May 25, 2023

(30) Foreign Application Priority Data

Mar. 30, 2020  (KR) ........................ 10-2020-0038452

(51) Int. Cl.
*H04W 74/08*   (2024.01)
*H04W 4/06*    (2009.01)
*H04W 74/0808* (2024.01)

(52) U.S. Cl.
CPC ........ *H04W 74/0808* (2013.01); *H04W 4/06* (2013.01)

(58) Field of Classification Search
CPC .. H04W 74/0808; H04W 28/18; H04W 84/12
See application file for complete search history.

(56) References Cited

U.S. PATENT DOCUMENTS 9,521,609 B2   12/2016   Kim et al.
9,838,954 B2   12/2017   Kim et al.
(Continued)

FOREIGN PATENT DOCUMENTS

CN    108337698 A    7/2018
KR    20170133165 A    12/2017
(Continued)

OTHER PUBLICATIONS

"Multi-link BSS parameter Update" by Media Tek. (Year: 2020).*
(Continued)

*Primary Examiner* — Pamit Kaur
(74) *Attorney, Agent, or Firm* — Lempia Summerfield Katz LLC

(57) ABSTRACT

A method and device for updating parameters in a communication system supporting multi-link are disclosed. An operation method for a first device comprises: transmitting a first frame to a second device through a first link in a multi-link, the first frame including updated parameters used for a communication operation in the first link; transmitting (Continued)

a second frame to the second device through a second link in the multi-link, the second frame including information indicating that the updated parameters are present; and transmitting a third frame including the updated parameters to the second device through one link in the multi-link.

20 Claims, 13 Drawing Sheets

(56) References Cited

U.S. PATENT DOCUMENTS

| | | | |
|---|---|---|---|
| 11,032,207 | B2 | 6/2021 | Patil et al. |
| 11,246,057 | B2 | 2/2022 | Hyun et al. |
| 2013/0176925 | A1 | 7/2013 | Sampath et al. |
| 2015/0245282 | A1 | 8/2015 | Kim et al. |
| 2017/0070948 | A1 | 3/2017 | Kim et al. |
| 2018/0132178 | A1* | 5/2018 | Park .................. H04W 52/0216 |
| 2019/0158385 | A1 | 5/2019 | Patil |
| 2019/0158413 | A1 | 5/2019 | Patil et al. |
| 2019/0289539 | A1* | 9/2019 | Lee ....................... H04W 84/18 |
| 2020/0163141 | A1* | 5/2020 | Hsu ................... H04W 36/0069 |
| 2020/0322841 | A1 | 10/2020 | Hyun et al. |
| 2021/0250848 | A1* | 8/2021 | Seok ...................... H04W 48/16 |
| 2021/0274500 | A1* | 9/2021 | Cariou .................. H04W 48/08 |

FOREIGN PATENT DOCUMENTS

| | | |
|---|---|---|
| TW | 201924403 A | 6/2019 |
| WO | 2014027829 A1 | 2/2014 |

OTHER PUBLICATIONS

Multi-link channel access discussion by (Sharan) Samsung (Year: 2019).*
Duncan Ho et al.; MLA: Non-STR STA Behaviors; Qualcomm; doc.: IEEE Mar. 2020 802.11-20/0444r0; Mar. 2020; 6 pp.
International Search Report and Written Opinion cited in corresponding international application No. PCT/KR2021/003732; Jun. 25, 2021; 8 pp.
Sharan Naribole et al., MLO Constraint Indication and Operating Mode, IEEE 802.11-20/0226r0; Mar. 2020; 23 pp.
Sharan Naribole et al., Multi-link Channel Access Discussion, IEEE 802.11-19/1405r7; Nov. 2019; 19 pp.
Yongho Seok et al., Multi-link BSS Parameter Update, IEEE 802.11-20/0337r0; Feb. 2020; 15 pp.

* cited by examiner

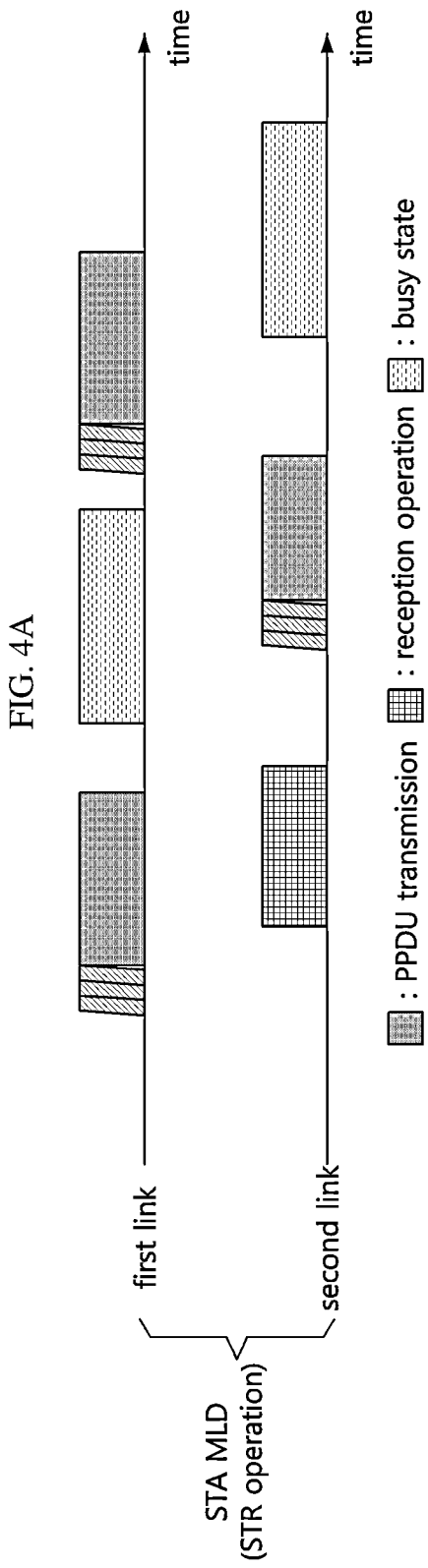

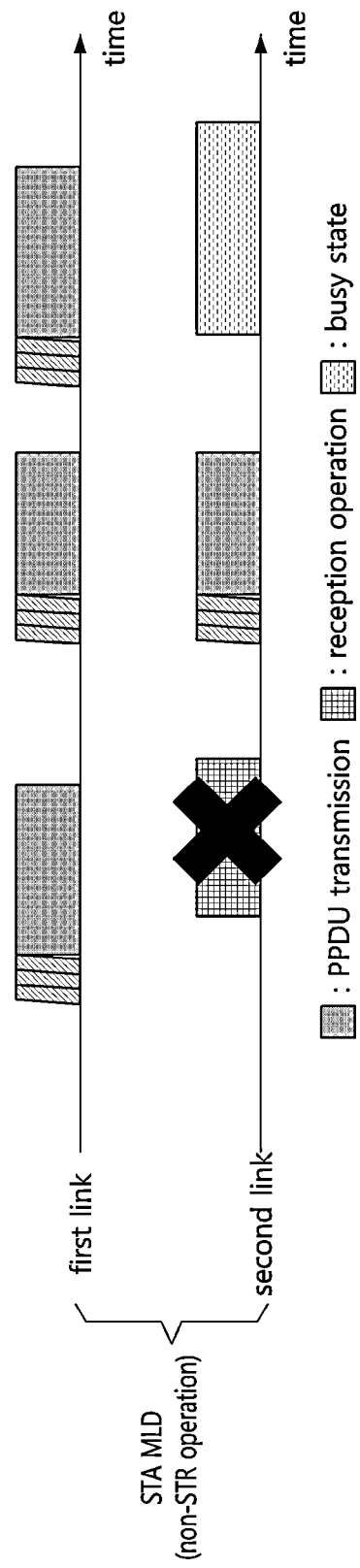

METHOD AND DEVICE FOR UPDATING PARAMETERS IN COMMUNICATION SYSTEM SUPPORTING MULTI-LINK

CROSS-REFERENCE TO RELATED APPLICATIONS

This application is a U.S. national stage of International Application No. PCT/KR2021/003732, filed on Mar. 25, 2021, which claims priority to Korean Patent Application No. 10-2020-0038452 filed on Mar. 30, 2020, the entire disclosures of which are incorporated by reference herein in its entirety.

TECHNICAL FIELD

The present disclosure relates to a wireless local area network (LAN) communication technique, and more particularly, to a technique for updating parameters in a wireless LAN supporting a multi-link.

BACKGROUND

Recently, as the spread of mobile devices expands, a wireless local area network technology capable of providing fast wireless communication services to mobile devices is in the spotlight. The wireless local area network (LAN) technology may be a technology that supports mobile devices such as smart phones, smart pads, laptop computers, portable multimedia players, embedded devices, and the like to wirelessly access the Internet based on wireless communication technology.

The standards using the wireless LAN technology are being standardized as IEEE802.11 standards mainly in the Institute of Electrical and Electronics Engineers (IEEE). The initial version of the IEEE 802.11 standard can support a communication speed of 1 to 2 megabits per second (Mbps). The later versions of the IEEE 802.11 standard are being standardized in the direction of improving the communication speed.

The revised version of the IEEE 802.11a standard can support a communication speed of up to 54 Mbps using an orthogonal frequency division multiplexing (OFDM) scheme in a 5 giga hertz (GHz) band. The IEEE 802.11b standard utilizes a direct sequence spread spectrum (DSSS) scheme to support a communication speed of up to 11 Mbps in a 2.4 GHz band where the initial version operates.

The IEEE 802.11n standard supporting a high throughput (HT) wireless LAN technology has been developed due to the demand for higher speed. The IEEE 802.11n standard may support the OFDM scheme. By supporting channel bandwidth expansion techniques and multiple input multiple output (MIMO) techniques in the IEEE 802.11n standard, the maximum communication speeds in the 2.4 GHz band and the 5 GHz band can be improved. For example, the IEEE 802.11n standard can support a communication speed of up to 600 Mbps by using 4 spatial streams and a 40 MHz bandwidth.

As the above-described wireless LAN technologies have been developed and spread, applications using the wireless LAN technologies have been diversified, and a demand for a wireless LAN technology supporting a higher throughput has arisen. Accordingly, a frequency bandwidth (e.g., 'maximum 160 MHz bandwidth' or '80+80 MHz bandwidth') used in the IEEE 802.11ac standard has been expanded, and the number of supported spatial streams has also increased. The IEEE 802.11ac standard may be a very high throughput (VHT) wireless LAN technology supporting a high throughput of 1 gigabit per second (Gbps) or more. The IEEE 802.11ac standard can support downlink transmission for multiple stations by utilizing the MIMO techniques.

As the demand for wireless LAN technologies further increases, the IEEE 802.11ax standard has been developed to increase a frequency efficiency in a dense environment. In the IEEE 802.11ax standard, a communication procedure may be performed using multi-user (MU) orthogonal frequency division multiple access (OFDMA) techniques. In the IEEE 802.11ax standard, uplink communication may be performed using the MU MIMO techniques and/or OFDMA techniques.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g., 320 MHz bandwidth), multi-link transmission and aggregation operations including multi-band operations, multiple access point (AP) transmission operations, and/or efficient retransmission operations (e.g., hybrid automatic repeat request (HARQ) operations).

However, since the multi-link operation is an operation that is not defined in the existing WLAN standard, it may be necessary to define detailed operations according to the environment in which the multi-link operation is performed. In particular, when two or more bands performing the multi-link operation are close to each other, simultaneous transmission and reception operations through a multi-link may not be performed within one device due to signal interference between the adjacent links. In particular, when a signal interference level between the adjacent links is equal to or greater than a specific level, a backoff operation for transmission in another link may not be performed due to the interference while performing a transmission operation in one link. Therefore, in the above-described situations, a method of updating parameter(s) for multi-link operations may be required.

Meanwhile, the technologies that are described in the Background section are written to improve the understanding of the background of the present disclosure and may include content that is not already known to those of ordinary skill in the art to which the present disclosure belongs.

SUMMARY

Technical Problem

The present disclosure is directed to providing a method and an apparatus for updating parameter(s) in a wireless local area network (LAN) system supporting a multi-link.

Technical Solution

An operation method of a first device, according to a first embodiment of the present disclosure for achieving the above-described objectives, may comprise: transmitting, to a second device, a first frame including updated parameters used for a communication operation in a first link through the first link in the multi-link; transmitting, to the second device, a second frame including information indicating that the updated parameters exist through a second link in the multi-link; and transmitting, to the second device, a third frame including the updated parameters through one link in the multi-link.

The first frame and the second frame may be beacon frames and the third frame may be a beacon frame or a probe response frame.

The beacon frame and the probe response frame may be transmitted to a plurality of devices including the second device based on a broadcast scheme.

When the second device does not support a simultaneous transmit and receive (STR) operation in the multi-link and a data frame is transmitted in the second link during a reception period of the first frame in the first link, the first frame may not be received by the second device.

The first frame and the second frame may be transmitted periodically and the third frame may be transmitted periodically or according to a request of the second device or another device.

In order to ensure reception of the third frame in the second device, a transmission prohibition period for prohibiting transmission during a time when the third frame is transmitted may be configured in link(s) other than the one link through which the third frame is transmitted.

The transmission prohibition period may be configured by an indication of the first device. The transmission prohibition period may be configured together with a link or channel in which transmission is prohibited.

An operation method of a second device, according to a second embodiment of the present disclosure for achieving the above-described objective, may comprise: transmitting, to a first device, a data frame through a second link in the multi-link; in response to the data frame, receiving, from the first device, a response frame including a reception response to the data frame and a critical update flag indicating that parameters have been updated through the second link; and receiving, from the first device, a management frame including the updated parameters.

The response frame may be an acknowledgment (ACK) frame or a block ACK (BA) frame for the data frame.

The management frame may be received in the first link and a network allocation vector (NAV) for the second link may be set to ensure reception of the management frame in the second device.

The management frame may be a beacon frame or a probe response frame.

Advantageous Effects

According to the present disclosure, communications between a STA and an AP can be performed using multiple links. When some links (e.g., some channels) are adjacent among the multiple links, making simultaneous transmission/reception operations difficult, and when a transmission operation is being performed in a link other than a first link, information for parameter update may not be received in the first link. To solve this problem, information indicating that parameters for the first link have been changed may be transmitted in a second link. A transmission resource (e.g., time and/or frequency resource) for the information indicating that the parameters have been changed may be distinguished from a transmission resource for other frames. Accordingly, the parameters can be updated quickly, and the transmission efficiency can be improved.

DESCRIPTION OF DRAWINGS

FIG. 4A is a timing diagram illustrating a first embodiment of a channel access method in a wireless LAN system supporting a multi-link.

FIG. 4B is a timing diagram illustrating a second embodiment of a channel access method in a wireless LAN system supporting a multi-link.

DETAILED DESCRIPTION

Figure 1:
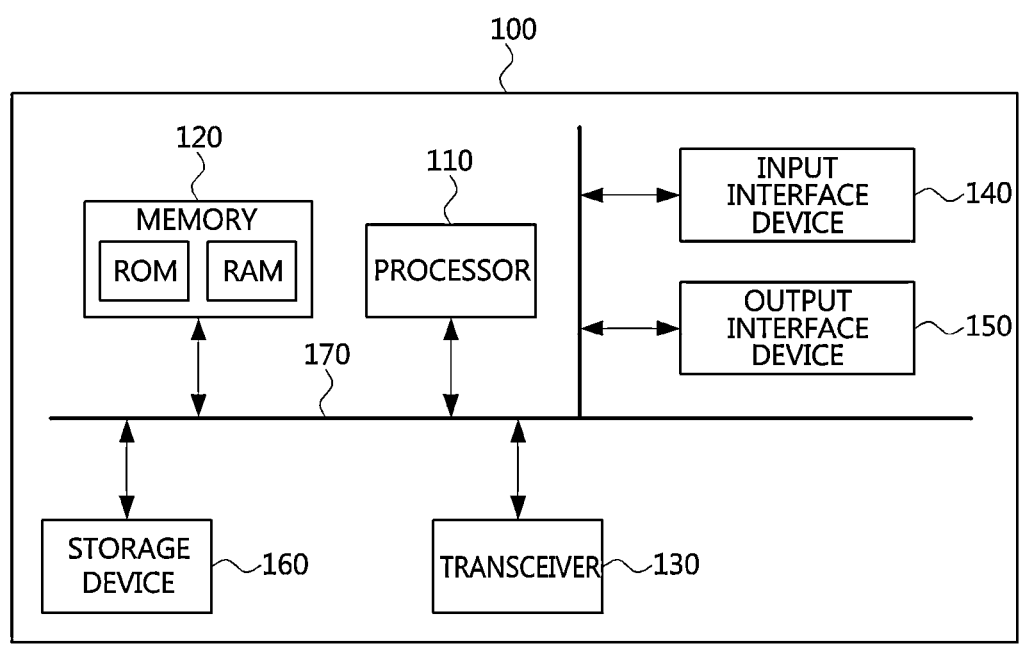
FIG. 1 is a block diagram illustrating a first embodiment of a communication node constituting a wireless local area network (LAN) system.

Since the embodiments of the present disclosure may be variously modified and may have several forms, specific embodiments are shown in the accompanying drawings and are described in the detailed description. It should be understood, however, that it is not intended to limit the present disclosure to the specific embodiments. On the contrary, the present disclosure is intended to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named as a second component without departing from the scope of the present disclosure, and the second component may also be similarly named as the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it should be understood that a further component is not disposed therebetween.

The terms used in the present disclosure are only used to describe specific embodiments and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists. However, it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms or embodiments of the present disclosure are described in detail with reference to the accompanying drawings. In describing the embodiments, to facilitate the entire understanding of the disclosure, like numbers refer to like elements throughout the description of the figures. The repetitive description thereof has been omitted.

In the following, a wireless communication system to which embodiments according to the present disclosure are applied is described. The wireless communication system to which the embodiments according to the present disclosure are applied is not limited to the contents described below, and the embodiments according to the present disclosure can be applied to various wireless communication systems. A wireless communication system may be referred to as a 'wireless communication network'.

FIG. 1 is a block diagram illustrating a first embodiment of a communication node constituting a wireless local area network (LAN) system.

As shown in FIG. 1, a communication node 100 may be an access point, a station, an access point (AP) multi-link device (MLD), or a non-AP MLD. The access point may refer to an AP, and the station may refer to a STA or a non-AP STA. The operating channel width supported by the access point may be 20 megahertz (MHz), 80 MHz, 160 MHz, or the like. The operating channel width supported by the station may be 20 MHz, 80 MHz, or the like.

The communication node 100 may include at least one processor 110, a memory 120, and a plurality of transceivers 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, or the storage device 160 through a dedicated interface.

The processor 110 may execute at least one instruction stored in at least one of the memory 120 or the storage device 160. The processor 110 may refer to a central processing unit (CPU), a graphics processing unit (GPU), or a dedicated processor on which the methods according to the embodiments of the present invention are performed. Each of the memory 120 and the storage device 160 may be configured as at least one of a volatile storage medium and a nonvolatile storage medium. For example, the memory 120 may be configured with at least one of a read only memory (ROM) or a random access memory (RAM).

Figure 2:
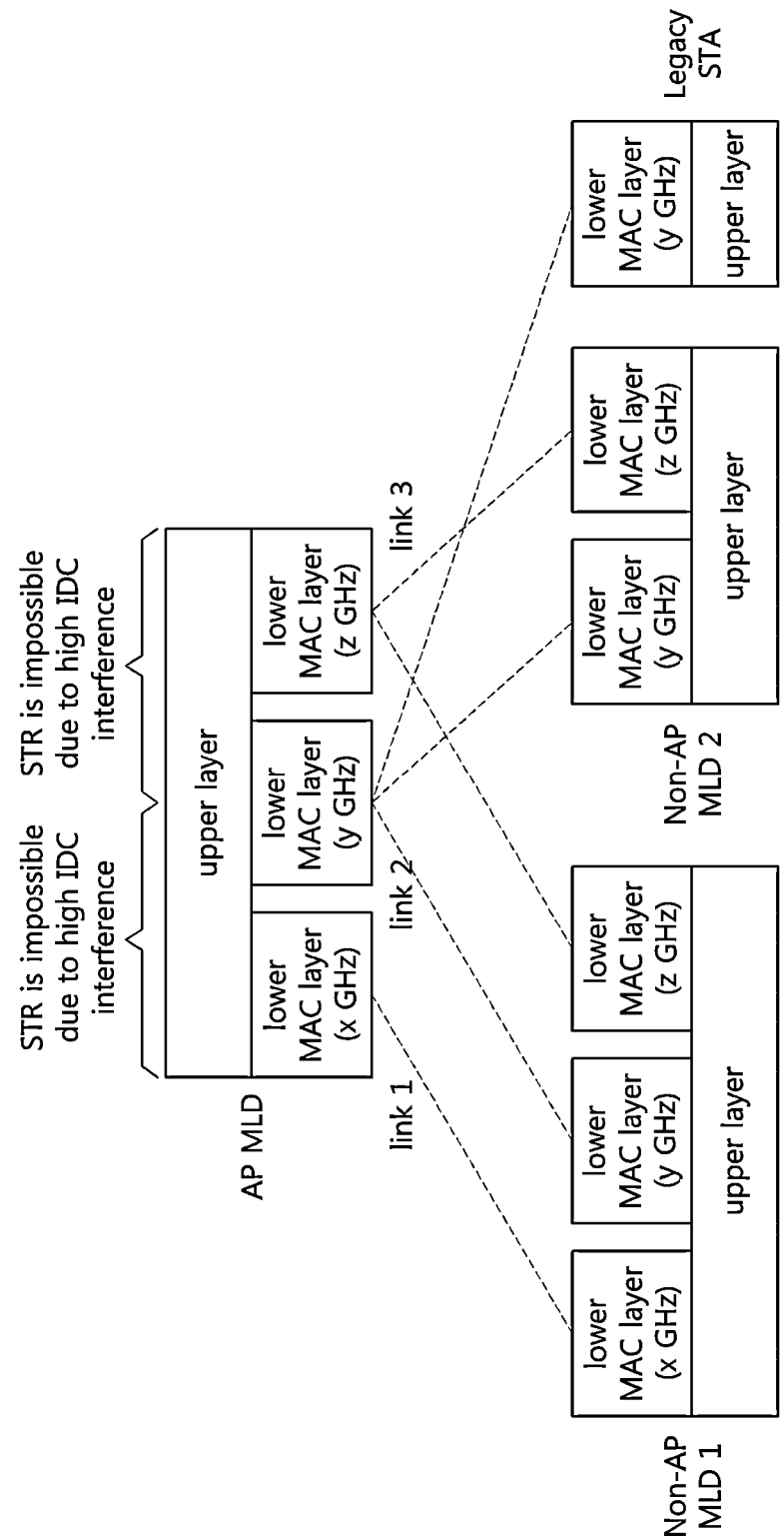
FIG. 2 is a conceptual diagram illustrating a first embodiment of multi-links configured between multi-link devices (MLDs).

FIG. 2 is a conceptual diagram illustrating a first embodiment of multi-links configured between MLDs.

As shown in FIG. 2, an MLD may have one medium access control (MAC) address. In embodiments, the MLD may mean an AP MLD and/or non-AP MLD.

The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) (STA(s)) affiliated with the non-AP MLD may have different MAC addresses. Each of the APs having different MAC addresses may be in charge of each link among multiple links supported by the AP MLD and may perform a role of an independent AP.

Each of the STAs having different MAC addresses may be in charge of each link among multiple links supported by the non-AP MLD, and may perform a role of an independent STA. The non-AP MLD may be referred to as a STA MLD. The MLD may support a simultaneous transmit and receive (STR) operation. In this case, the MLD may perform a transmission operation in a link 1 and may perform a reception operation in a link 2. The MLD supporting the STR operation may be referred to as an STR MLD (e.g., STR AP MLD, STR non-AP MLD). In embodiments, a link may mean a channel or a band. A device that does not support the STR operation may be referred to as a non-STR (NSTR) AP MLD or an NSTR non-AP MLD (or NSTR STA MLD).

The MLD may transmit and receive frames in multiple links (i.e., multi-link) by using a non-contiguous bandwidth extension scheme (e.g., 80 MHz+80 MHz). The multi-link operation may include multi-band transmission. The AP MLD may include a plurality of APs, and the plurality of APs may operate in different links. Each of the plurality of APs may perform function(s) of a lower MAC layer. Each of the plurality of APs may be referred to as a 'communication node' or 'lower entity'. The communication node (i.e., AP) may operate under control of an upper layer (or the processor 110 shown in FIG. 1). The non-AP MLD may include a plurality of STAs, and the plurality of STAs may operate in different links. Each of the plurality of STAs may be referred to as a 'communication node' or 'lower entity'. The communication node (i.e., STA) may operate under control of an upper layer (or the processor 110 shown in FIG. 1).

The MLD may perform communications in multiple bands (i.e., multi-band). For example, the MLD may perform communications using a 40 MHz bandwidth according to a channel expansion scheme (e.g., bandwidth expansion scheme) in a 2.4 GHz band and may perform communications using a 160 MHz bandwidth according to a channel expansion scheme in a 5 GHz band. The MLD may perform communications using a 160 MHz bandwidth in the 5 GHz band and may perform communications using a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link. Alternatively, the respective links may be referred to as a link 1, a link 2, and a link 3. A link number may be set by the AP, and an identifier (ID) may be assigned to each link.

The MLD (e.g., AP MLD and/or non-AP MLD) may configure a multi-link by performing an access procedure and/or a negotiation procedure for a multi-link operation. In this case, the number of links and/or link(s) to be used in the multi-link may be configured. The non-AP MLD (e.g., STA) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g., IEEE 802.11a/b/g/n/ac/ax STA) may be connected to one or more links of the multi-link supported by the AP MLD.

When a band separation between multiple links (e.g., a band separation between the link 1 and the link 2 in the frequency domain) is sufficient, the MLD may perform an STR operation. For example, the MLD may transmit a physical layer convergence procedure (PLCP) protocol data unit (PPDU) 1 using the link 1 among multiple links and may receive a PPDU 2 using the link 2 among multiple links. On the other hand, if the MLD performs the STR operation when the band separation between multiple links is insufficient, in-device coexistence (IDC) interference, which is interference between the multiple links, may occur. Therefore, when the band separation between multiple links is not sufficient, the MLD may not be able to perform the STR operation. A link pair having the above-described interference relationship may be a non-simultaneous transmit and receive (NSTR) limited link pair. Here, the MLD may be an NSTR AP MLD or an NSTR non-AP MLD.

For example, a multi-link including a link 1, a link 2, and a link 3 may be configured between the AP MLD and the non-AP MLD 1. If the band separation between the link 1 and the link 3 is sufficient, the AP MLD may perform an STR operation using the link 1 and the link 3. In other words, the AP MLD may transmit a frame using the link 1 and may receive a frame using the link 3. If the band separation between the link 1 and the link 2 is not sufficient, the AP MLD may not be able to perform an STR operation using the link 1 and the link 2. If a band separation between the link 2 and the link 3 is not sufficient, the AP MLD may not be able to perform an STR operation using the link 2 and the link 3.

Meanwhile, in a wireless LAN system, a negotiation procedure for a multi-link operation may be performed in an access procedure between a STA and an AP.

A device (e.g., AP or STA) supporting a multi-link may be referred to as a multi-link device (MLD). An AP supporting a multi-link may be referred to as an AP MLD, and a STA supporting a multi-link may be referred to as a non-AP MLD or STA MLD. The AP MLD may have a physical address (e.g., MAC address) for each link. The AP MLD may be implemented as if an AP in charge of each link exists separately. A plurality of APs may be managed within one AP MLD. Accordingly, coordination between the plurality of APs belonging to the same AP MLD may be possible. The STA MLD may have a physical address (e.g., MAC address) for each link. The STA MLD may be implemented as if an STA in charge of each link exists separately. A plurality of STAs may be managed within one STA MLD. Accordingly, coordination between the plurality of STAs belonging to the same STA MLD may be possible.

For example, an AP1 of the AP MLD and a STA1 of the STA MLD may each be in charge of a first link and may communicate using the first link. An AP2 of the AP MLD and a STA2 of the STA MLD may each be in charge of a second link and may communicate using the second link. The STA2 may receive state change information for the first link in the second link. In this case, the STA MLD may collect information (e.g., state change information) received from each link and may control operations performed by the STA1 based on the collected information.

Figure 3:
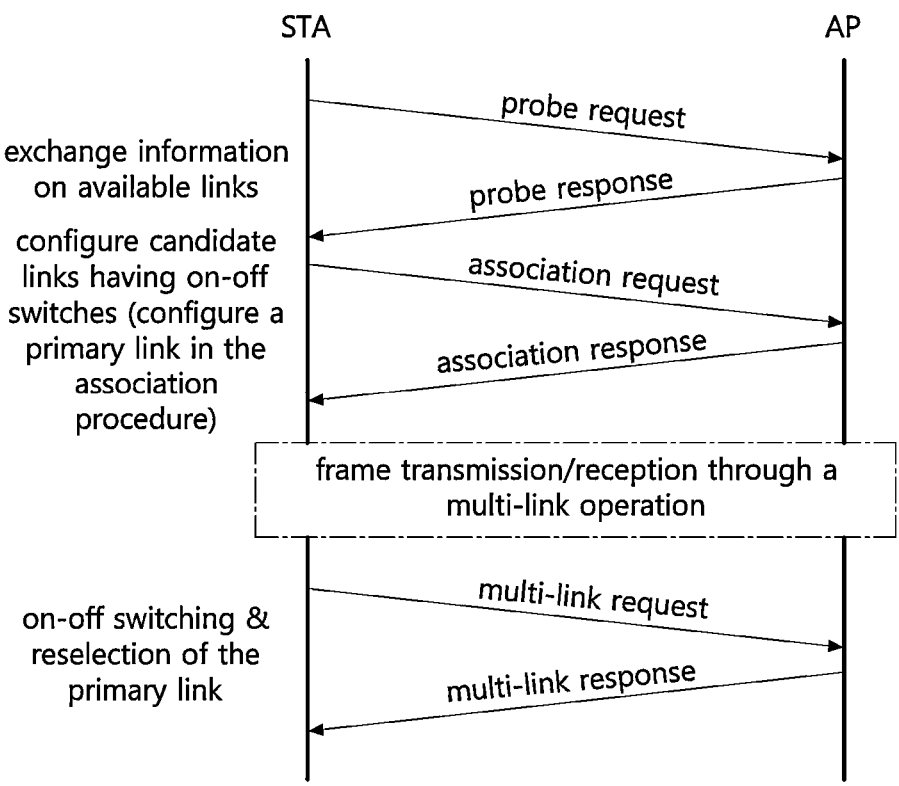
FIG. 3 is a sequence chart illustrating a first embodiment of a negotiation procedure for a multi-link operation in a wireless LAN system.

FIG. 3 is a sequence chart illustrating a first embodiment of a negotiation procedure for a multi-link operation in a wireless LAN system.

As shown in FIG. 3 an access procedure between an STA and an AP in an infrastructure basic service set (BSS) may generally be divided into a probe step of probing AP(s), an authentication step for authentication between the STA and the probed AP, and an association step of association between the STA and the authenticated AP.

In the probe step, the STA may detect one or more APs using a passive scanning scheme or an active scanning scheme. When the passive scanning scheme is used, the STA may detect one or more APs by overhearing beacons transmitted by the one or more APs. When the active scanning scheme is used, the STA may transmit a probe request frame and may detect one or more APs by receiving probe response frames that are responses to the probe request frame from the one or more APs.

When the one or more APs are detected, the STA may perform an authentication step with the detected AP(s). In this case, the STA may perform the authentication step with a plurality of APs. An authentication algorithm according to the IEEE 802.11 standard may be classified into an open system algorithm of exchanging two authentication frames, a shared key algorithm of exchanging four authentication frames, and the like.

The STA may transmit an authentication request frame based on the authentication algorithm according to the IEEE 802.11 standard. The STA may also complete authentication with the AP by receiving an authentication response frame that is a response to the authentication request frame from the AP.

When the authentication with the AP is completed, the STA may perform an association step with the AP. In particular, the STA may select one AP among AP(s) with which the STA has performed the authentication step and may perform the association step with the selected AP. In other words, the STA may transmit an association request frame to the selected AP and may complete the association with the AP by receiving an association response frame that is a response to the association request frame from the selected AP.

Meanwhile, a multi-link operation may be supported in the wireless LAN system. A multi-link device (MLD) may include one or more STAs affiliated with the MLD. The MLD may be a logical entity. The MLD may be classified into an AP MLD and a non-AP MLD. Each STA affiliated with the AP MLD may be an AP, and each STA affiliated with the non-AP MLD may be a non-AP STA. In order to configure a multi-link, a multi-link discovery procedure, a multi-link setup procedure, and the like may be performed. The multi-link discovery procedure may be performed in the probe step between an STA and an AP. In this case, multi-link information elements (ML IEs) may be included in the beacon frame, the probe request frame, and/or the probe response frame.

For example, in order to perform a multi-link operation, in the probe step, the AP (e.g., AP affiliated with an MLD) may exchange information indicating whether the multi-link operation can be used and information on available link(s) with the STA (e.g., non-AP STA affiliated with an MLD). In a negotiation procedure for the multi-link operation (e.g., multi-link setup procedure), the STA may transmit information of link(s) to be used for the multi-link operation. The negotiation procedure for the multi-link operation may be performed in the access procedure (e.g., association step) between the STA and the AP, and information element(s) required for the multi-link operation may be configured or changed by an action frame in the negotiation procedure.

In addition, in the access procedure (e.g., association step) between the STA and the AP, available link(s) of the AP may be configured, and an identifier (ID) may be assigned to each link. Thereafter, in the negotiation procedure and/or change procedure for the multi-link operation, information indicating whether each link is activated may be transmitted, and the information may be expressed using the link ID(s).

The information indicating whether the multi-link operation can be used may be transmitted and received in a procedure of exchanging capability information element(s) (e.g., EHT capability information element(s)) between the STA and the AP. The capability information element(s) may include information of supporting band(s), information of supporting link(s) (e.g., ID(s) and/or number of supporting link(s)), information of links capable of simultaneous transmission and reception (STR) operations (e.g., information on bands of the links, information on a separation between the links), and/or the like. In addition, the capability information element(s) may include information that individually indicates a link capable of the STR operation.

FIG. 4A is a timing diagram illustrating a first embodiment of a channel access method in a wireless LAN system supporting a multi-link, and FIG. 4B is a timing diagram illustrating a second embodiment of a channel access method in a wireless LAN system supporting a multi-link.

As shown in FIGS. 4A and 4B, when a band separation between a plurality of links is sufficient, a transmission operation in a first link and a reception operation in a second link may be simultaneously performed. The transmission operations using the multi-link may be implemented in a per-link independent transmission scheme. The above-described transmission operations may be performed in a device (e.g., AP or STA) capable of supporting an STR operation. In other words, the above-described transmission operations may be performed in a link pair other than an NSTR-limited link pair.

When the independent transmission scheme is used, a lower layer (e.g., physical (PHY) layer and/or a MAC layer) may separately perform a channel access operation in each link (e.g., the first link and the second link) to transmit a frame (e.g., PDU) obtained from an upper layer. When a transmission opportunity (TXOP) is secured by the channel access operation, the lower layer may transmit the frame within the corresponding TXOP.

The channel access operation may be a carrier sensing operation performed for an arbitration interframe space (AIFS) according to data (e.g., access category (AC) of the data) included in the frame. The carrier sensing operation may be referred to as a 'channel sensing operation'. When a channel (e.g., link) is determined to be in a busy state by the carrier sensing operation or when a transmission of a data frame of another station is completed, the channel access operation may include a carrier sensing operation within the AIFS and a backoff operation.

The carrier sensing operation may be classified into a physical (PHY layer) carrier sensing operation and a virtual carrier sensing operation. The physical carrier sensing operation may be an energy detection (ED) operation of sensing a received power in an operating channel (e.g., operating link). The virtual carrier sensing operation may include a setting operation based on a value of a length field included in a preamble of a frame (e.g., PPDU or MPDU) received from another station and a network allocation vector (NAV) setting operation based on a value of a duration field of a MAC header or a value of a TXOP field included in a frame received from another station. The NAV setting operation may be an operation of setting a parameter for configuring a transmission prohibition period or the transmission prohibition period as a time when a terminal does not start transmission (i.e., a time when another terminal performs a transmission operation). A transmission time may be independent of a physical channel sensing result. The NAV setting operation may be an operation of setting a period (e.g., busy period) in which transmission of a frame is prohibited by a value of a duration field included in a MAC header of a frame transmitted by terminals within and/or out of a basic service set (BSS). When the virtual carrier sensing is successful and a NAV is set, a period for which the NAV is set may be determined as a busy period without performing actual carrier sensing.

When the independent transmission scheme is used, transmission times of frames in the links (e.g., link 1 and link 2) may not match. Since the channel access operation in each of the links is performed independently, the links can be used efficiently. In embodiments, a backoff operation (e.g., backoff procedure, random backoff operation) may mean a channel access procedure performed when a channel state is determined to be a busy state.

On the other hand, when the band separation between the plurality of links is not sufficient, a transmission operation in the first link may cause interference to the second link of the same device. The aforementioned interference may be in-device coexistence interference (IDC). In embodiments, the device may mean an MLD, an AP, and/or a STA. When such an IDC interference occurs, an STR operation may not be possible in the plurality of links. A link pair in which an STR operation is not possible may be referred to as an 'NSTR-limited link pair'. For example, when a device uses two links (e.g., first link and second link) operating in a 5 GHz band, if a separation between the links is not sufficient, it may not be possible to simultaneously perform a transmission operation in the first link and a reception operation in the second link. Therefore, the multi-link operation may not be implemented in the per-link independent transmission scheme. In this case, the multi-link operation may be implemented in a synchronized transmission scheme. In embodiments, the multi-link operation may mean a transmission/reception operation using a multi-link.

When a transmission event occurs, the device may perform a channel connection operation. For example, the device may identify a channel occupancy state, and when a channel state is in an idle state, the device may perform an additional channel sensing operation for a specific time period (e.g., AIFS). When the channel state is in an idle state for the specific time period, the device may finally determine that the channel is in the idle state. In other words, the device may determine that the channel access is successful. In this case, a backoff operation may not be performed, and a backoff counter value may be 0.

On the other hand, when the channel state is in a busy state (e.g., occupied state), the device may wait until the channel state becomes an idle state. When the channel state is changed from the busy state to the idle state, the device may perform a backoff operation after waiting for an AIFS. The AIFS may start from a time when the channel state is changed from the busy state to the idle state. When the backoff operation is successfully completed, the device may transmit a frame.

When the backoff operation is performed, the device may select an arbitrary number (e.g., backoff counter value) from 0 to a contention window (CW). The CW may be set differently according to an access category (AC) of data. The device may perform a channel sensing operation in slot(s) corresponding to the selected backoff counter value. For example, when the backoff count value is 5, the device may perform the channel sensing operation in 5 slots (e.g., slots 1 to 5).

The channel sensing operation may be performed in each slot, and when the channel sensing operation is successful in each slot, the backoff counter value may decrease by one. When the channel state in the slot 1 is determined to be the idle state as a result of the channel sensing operation in the slot 1, the backoff counter value may be set to 4 (e.g., 5−1). When the channel state in the slot 2 after the slot 1 is determined to be the idle state as a result of the channel sensing operation, the backoff counter value may be set to 3 (e.g., 4−1). When the channel state in the slot 5 that is the last slot is determined to be the idle state as a result of the channel sensing operation, the backoff counter value may be set to 0 (e.g., 1−1). When the backoff counter value becomes 0, the device may determine that the backoff operation is successful.

When the channel access operation is successful and a transmission event does not occur, the device may wait for transmission of a frame (e.g., data). Thereafter, when a transmission event occurs, the device may immediately transmit the frame without a backoff operation because the channel access operation has already succeeded. In other words, when the backoff counter value is maintained at 0, the device may transmit a frame without a backoff operation.

When the synchronized transmission scheme is used, transmission start times and/or transmission end times of frames transmitted in the respective links may be set identically. In order to match the frame transmission times equally in the multi-link operation based on the synchronized transmission scheme, if the lengths of frames transmitted in the respective links are different, padding bits may be added to a frame having a shorter length to match the lengths of the frames. When channel access operations for simultaneous transmissions are performed, a backoff operation is performed in the first link, and a channel state of the second link from a specific time to an end time (e.g., success time) of the backoff operation in the first link is an idle state, the device may perform transmission operations using the plurality of links (e.g., the first link and the second link). A time from the specific time to the end time of the backoff operation in the first link may be a point coordination function (PCF) interframe space (PIFS), a distributed coordination function (DCF) interframe space (DIFS), AIFS, or a total time of the backoff operation in the first link.

'Identifying the channel occupancy state of the second link for the time from the specific time to the end time of the backoff operation in the first link' may be for 'identifying whether the channel occupancy state of the second link is the idle state in which frame transmission is possible'. In other words, 'identifying the channel occupancy state of the second link for the time from the specific time to the end time of the backoff operation in the first link' may mean 'performing the channel sensing operation (e.g., carrier sensing operation) in the second link for the time from the specific time to the end time of the backoff operation in the first link'.

In order to perform simultaneous transmissions using the first link and the second link, channel access operations may be performed. In this case, the channel access operations may be simultaneously performed in the first link and the second link. If the second link is in an idle state at a start time of the channel access operation, and the idle state of the second link is maintained for a specific time (e.g., AIFS), the device may determine the second link to be in the idle state. In this case, since a backoff operation may not be performed in the second link, a backoff counter value thereof may be 0. Here, a link other than the first link may be configured as the second link.

Meanwhile, after the backoff operation ends in the first link, an operation of identifying a channel occupancy state may be performed in the second link for a specific time period. When the channel state of the second link is a busy state for some time within the specific time period, the device may transmit a frame using only the first link. Alternatively, the device may perform a backoff operation in the second link. Alternatively, the device may perform a backoff operation in a plurality of the first links for channel access. The plurality of first links may be configured, and the backoff operation may be performed in the plurality of first links. In this case, when the channel state of the second link is in an idle state for a time period (hereinafter, referred to as 'specific time period') from an end time of a backoff operation in a link in which the backoff operation is first completed to a time before a specific time (e.g., PIFS, DIFS, AIFS, or a total time of the backoff operation of the first link), the device may perform transmission operations using the plurality of links.

'Identifying whether another link is in an idle state for the specific time period' may be 'identifying whether the link is in an idle state in which frame transmission is possible'. 'Identifying whether another link is in an idle state for the specific time period' may mean 'performing a channel sensing operation (e.g., carrier sensing operation) for the specific time period from the end time of the backoff operation in the first link to a time before a specific time'. In order to perform simultaneous transmissions using the first link and other link(s), a channel access operation may be performed. In other words, when the channel access operation is started in the first link, a channel access operation may be started in other link(s) at the same time. When a link in an idle state exists at the start time of the channel access operation and the idle state of the link is maintained for a specific time period (e.g., AIFS), the corresponding link may be determined as a link capable of simultaneous transmission. Since the backoff operation is not performed in the link in the idle state at the start of the channel access operation, a backoff counter value may be 0 in the link, which is in the idle state.

When a multi-link operation is performed based on the synchronized transmission scheme, a receiving device (e.g., STA or AP) may receive a plurality of frames simultaneously. Accordingly, a frame reception operation may be simplified. A frame (e.g., data) transmitted in the synchronized transmission scheme may include information on the links used for the simultaneous transmissions. The information (e.g., link IDs, etc.) of the links used for the simultaneous transmissions may be indicated in a bitmap form by an EHT signal (SIG) including information on a signal of the IEEE 802.11be in a preamble of a PPDU. Alternatively, the information (e.g., link IDs, etc.) of the links used for the simultaneous transmissions may be indicated by an EHT control field included in the frame.

Figure 5:
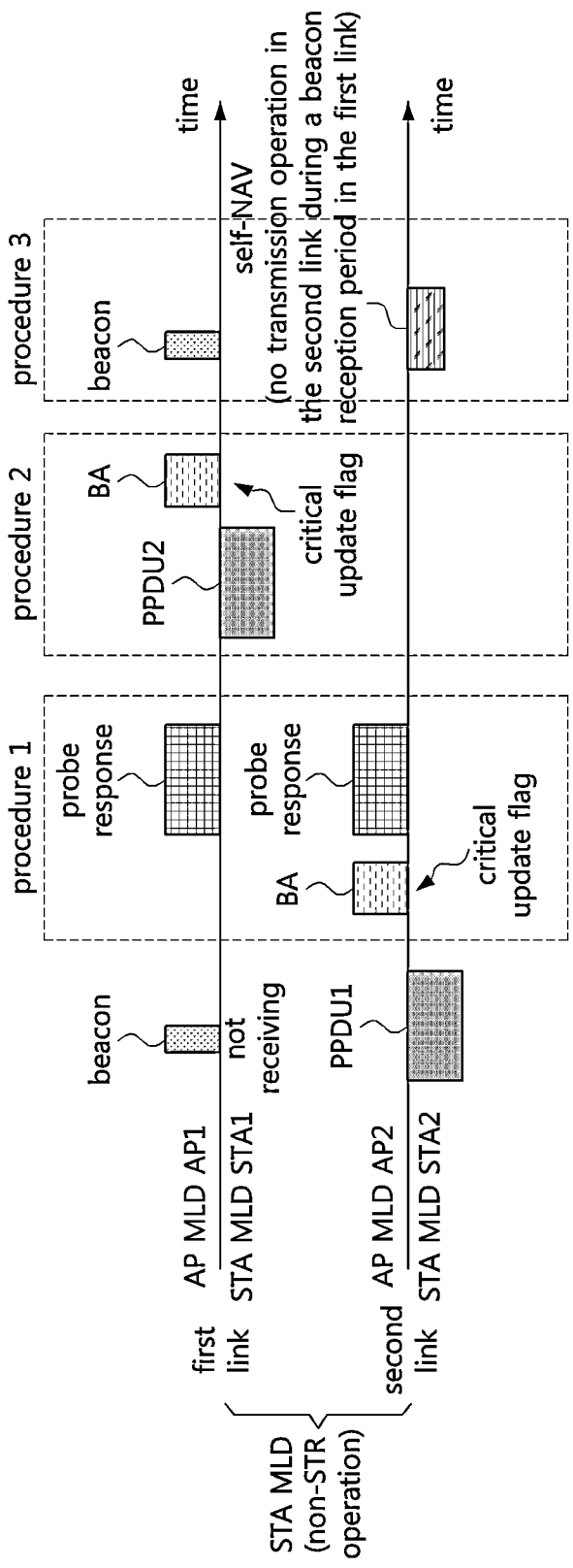
FIG. 5 is a timing diagram illustrating a first embodiment of a method for updating parameters in a wireless LAN system supporting a multi-link.

FIG. 5 is a timing diagram illustrating a first embodiment of a method for updating parameters in a wireless LAN system supporting a multi-link.

As shown in FIG. 5, a non-STR STA may mean a STA that cannot simultaneously perform a transmission operation in a first link and a reception operation in a second link. The reception operation in the second link may not be performed due to interference caused by the transmission operation in the first link. The non-STR STA may be a STA that cannot perform STR operations in an NSTR-limited link pair that is a specific link pair according to capabilities. Alternatively, the non-STR STA may be a STA that cannot perform STR operations regardless of a link pair.

The STA MLD may include a STA1 in charge of the first link and a STA2 in charge of the second link. An AP MLD may include an AP1 in charge of the first link and an AP2 in charge of the second link. Communication between the STA1 and the AP1 may be performed using the first link, and communications between the STA2 and the AP2 may be performed using the second link. The STA MLD may be a non-STR STA MLD that cannot perform STR operations. The STA1 of the non-STR STA MLD may not occupy the first link because the first link is in a busy state, and the STA2 of the non-STR STA MLD may use the second link to transmit a PPDU1 in the second link because the second link is available (e.g., since the second link is in an idle state).

When parameter(s) of the AP1 in charge of the first link are changed among parameter(s) (e.g., basic service set (BSS) parameter(s)) for communications applied to each BSS (e.g., per AP of the AP MLD), the AP1 of the AP MLD may transmit a beacon frame (or probe response frame) including the changed parameter(s) in the first link. In addition, the beacon frame (or probe response frame) may further include change sequence information, information indicating a target (e.g., a specific AP, all APs included in the AP MLD, or BSS) to which the updated parameters are applied, information indicating a time period for which the parameters are valid, and/or information indicating an area to which the parameters are applied (e.g., BSS, geographic area). When the parameters are updated, the change sequence information may indicate an increased value (e.g., a value increased by 1) from a previous value.

The AP1 of the AP MLD may be in charge of the first link, and the beacon frame may be transmitted according to a transmission periodicity. The beacon frame including the updated parameters may be transmitted during transmission of the PPDU1 of the STA2. The STA1 of the STA MLD that does not support STR operations may not receive the beacon frame from the APE Accordingly, the STA MLD (e.g., STA1 and/or STA2) may not update the changed parameter(s) and may not use the changed parameter(s) in the next communication procedure.

For example, since the updated parameters required for communications in the first link are not received, the STA1 may use unchanged parameter(s) after the time of transmission and reception of the beacon frame to attempt to transmit a frame (e.g., data frame) in the first link. In this case, since the unchanged parameter(s) are used, the frame transmission of the STA1 may fail. Even when the frame of the STA1 is transmitted, the AP1 may not receive (e.g., decode) the frame of the STA1 because it uses the changed parameter(s) after the transmission time of the beacon frame including the updated parameters. In other words, reception of the frame at the AP1 may fail. Because the STA1 fails to update the parameters, it may not receive (e.g., decode) a frame transmitted by the AP1 using the changed parameters.

When the STA1 of the STA MLD supporting STR operations operates in a power saving state or when communications in the STA MLD supporting STR operations are performed in the second link without using the first link, the STA1 of the STA MLD may not receive the beacon frame (or probe response frame) including the updated parameters in the first link. In this case, after the operating state of the STA1 transitions from the power saving state to a normal state, the STA1 may not be able to communicate with the AP1 without updating the parameters.

Procedures (e.g., procedure 1, procedure 2, procedure 3) for updating the parameters are described in embodiments below. A combination of one or more of the procedures may be used.

Procedure 1

In the procedure 1, in response to the PPDU1 received from the STA2, the AP2 may transmit, to the STA2 through the second link, a response frame (e.g., ACK frame or block ACK (BA) frame) including information indicating that the parameter(s) have been changed (e.g., critical update flag, urgent update indicator, or parameter change indicator). The STA2 may also receive the response frame including the critical update flag (e.g., urgent update indicator, parameter change indicator) from the AP2 in the second link. The critical update flag may be an indicator indicating that critical parameters of a specific link have been changed. In order to indicate that parameters of the AP in charge of the specific link or parameters of the BSS which the corresponding AP is in charge of have been changed, an identifier of the AP or BSS may be included in the corresponding frame together with the critical update flag. In embodiments, the critical update flag may mean the urgent update indicator or the parameter change indicator.

The critical update flag may be included in another control frame and/or another management frames that the AP2 transmits in the second link. For example, the AP2 may transmit a beacon frame, a probe response frame, and/or another management frame including the critical update flag in the second link. The STA2 may identify the critical update flag by receiving the beacon frame, the probe response frame, and/or another management frame from the AP2 in the second link. In this case, the STA MLD (e.g., STA1 and/or STA2) may determine that the parameter(s) used for communications (e.g., parameter(s) applied to the first link) have been changed based on the critical update flag. Accordingly, the STA MLD may stop or wait for a transmission operation in the first link and/or the second link. The STA MLD supporting STR operations may perform a transmission operation in the second link.

After receiving the critical update flag included in the frame in the second link, the STA2 may receive a frame including the changed parameters (e.g., updated parameters) from the AP2 in the second link. The frame including the changed parameters may be an unsolicited probe response frame. The unsolicited probe response frame may be a probe response frame transmitted without a probe request frame. Alternatively, the frame including the changed parameters may be a probe response frame that is a response to a probe request frame transmitted by another communication node (e.g., STA).

After a BA frame or ACK frame is transmitted in the second link, the unsolicited probe response frame may be transmitted in a unicast manner in the first link and/or the second link. In other words, a destination address of the unsolicited probe response frame may indicate a specific STA (e.g., STA2). When the probe response frame (e.g., unsolicited probe response frame) including the changed parameters is transmitted in the second link, information indicating that the changed parameters are applied to the first link (e.g., a link identifier or an identifier of the AP (e.g., AP ID or BSS ID)) may be included in the probe response frame. The probe response frame may be transmitted in a broadcast manner so that another communication node (e.g., STA that has not updated parameters) is able to overhear the probe response frame including the changed parameters.

When the critical update flag is received in the second link, the non-STR STA MLD may transmit a probe request frame in the first link and/or the second link in order to receive a probe response frame including updated parameters. The probe request frame transmitted in the second link may include information requesting transmission of the updated parameters for the first link (e.g., a link identifier or an identifier of the AP (e.g., AP ID or BSS ID)).

The AP MLD may transmit a beacon frame including the updated parameters instead of the probe response frame (e.g., unsolicited probe response frame). The beacon frame may include only the updated parameters. The updated parameters may be transmitted in the first link and/or the second link. The updated parameters may be transmitted using an available link among the supported links.

Procedure 2

The procedure 2 may be performed alone. Alternatively, the procedure 2 may be performed together with one or more operations of the procedure 1. When the procedure 2 is performed alone, since the AP MLD may identify that the beacon frame including updated parameters is transmitted while the STA2 is transmitting the PPDU1 and may identify the STA1 and the STA2 do not receive the updated parameters because the STA1 and the STA2 of the STA MLD do not support STR operations, the AP MLD may use unchanged parameters even after the transmission of the beacon frame to perform a reception operation (e.g., decoding operation) for a frame (e.g., PPDU2) transmitted by the STA1 of the STA MLD. Here, the frame of the STA MLD may be a frame first transmitted in the first link after a time of transmission and reception of the beacon frame including the updated parameters. A period in which a frame cannot be received in the first link due to PPDU transmission in the second link may be referred to as a 'deaf period'. As a method for the AP MLD to perform the reception operation for the PPDU2 using the unchanged parameters, the AP MLD may identify the STA (e.g., STA1) of the STA MLD that has not received the beacon frame including the updated parameters during the deaf period. The AP MLD may also receive (e.g., decode) the PPDU transmitted by the corresponding STA using the previous parameters until the next beacon frame including the updated parameters is transmitted. As another method for the AP MLD to perform the reception operation for the PPDU2 using the unchanged parameters, the AP MLD may receive (e.g., decode) the PPDU2 using the parameters before the update when failing (e.g., when an error occurs in a CRC check) to receive (e.g., decode) the PPDU2 transmitted by the STA1 using the updated parameters.

The AP MLD may generate a response frame (e.g., BA frame or ACK frame) including a reception response (e.g., ACK or NACK) to the frame of the STA MLD and a critical update flag and may transmit the response frame to the STA MLD (e.g., STA1). The STA MLD (e.g., STA1) may receive the response frame for the PPDU2 from the AP MLD (e.g., AP1) and may identify that the parameters have been changed based on the critical update flag included in the response frame.

After transmitting the critical update flag, the AP MLD (e.g., AP1) may transmit a probe response frame (e.g., unsolicited probe response frame) and/or a beacon frame including the updated parameters. The probe response frame and/or the beacon frame including the updated parameters may be transmitted in the first link and/or the second link. A transmission/reception operation of the probe response frame and/or beacon frame including the updated parameters in the procedure 2 may be performed identically or similarly to the transmission/reception operation of the probe response frame and/or beacon frame including the updated parameters in the procedure 1 described above.

Procedure 3

The procedure 3 may be performed after the frame including the critical update flag (e.g., BA frame or ACK frame including the critical update flag) is transmitted and received in the procedure 1 and/or the procedure 2. The AP MLD (e.g., AP1) may transmit the beacon frame including the updated parameters. The beacon frame may be transmitted in the first link. The STA MLD (e.g., STA1) may receive the beacon frame from the AP MLD and identify the updated parameters included in the beacon frame. The beacon frame may be transmitted/received in a preconfigured beacon transmission period (e.g., target beacon transmission time (TBTT)). The STA MLD may update parameters based on the information included in the beacon frame and may perform transmission/reception of a frame (e.g., data frame) using the updated parameters.

If the STA2 of the STA MLD does not perform a transmission operation in the second link in the next beacon transmission period, the STA1 of the STA MLD may receive the beacon frame including the updated parameters in the first link. Accordingly, the STA MLD may set a self-network allocation vector (NAV) in the next beacon transmission period. The self-NAV setting operation may be an operation of setting a parameter for a transmission prohibition period or the transmission prohibition period in which its own transmission in another link (e.g., second link) that may give interference to a current link (e.g., first link) is prohibited for a scheduled reception period of the current link (e.g., first link). The self-NAV may be used to ensure reception of the beacon including the updated parameters in the first link. When the NAV for the next beacon transmission period is set, the STA1 of the STA MLD may receive the beacon frame in the first link.

Whether to set the self-NAV may also be indicated by the AP MLD. The AP1 or AP2 of the AP MLD may transmit a self-NAV operation indication information element that is an indication to set a self-NAV so as not to perform transmission in the second link while the AP1 of the AP MLD transmits the beacon frame including the updated parameters in the first link. The self-NAV operation indication information element may include information on a 'quiet period', and information on an identifier of the AP, channel, or BSS for which the self-NAV is operated. The self-NAV operation indication information element may be included in the beacon frame or the probe response frame transmitted by the AP1 or AP2 of the AP MLD. The quiet period may be replaced with a 'do-not-transmit' indicator or information element. The terminal for which the self-NAV is operated may be any terminal operating in the link or channel for which the self-NAV indicated through the self-NAV operation indication information element is operated.

When the beacon frame includes information indicating a beacon transmission interval, a start time of the self-NAV may be after the beacon transmission interval from a reception time of the last beacon frame. When the beacon frame does not include information indicating a beacon transmission interval, the STA MLD may estimate a beacon transmission interval based on a plurality of beacon frames received from the AP MLD and may set a self-BAV for another link based on the estimated beacon transmission interval. When the beacon frame is received from the AP MLD in the first link, the STA MLD may release the self-NAV set in the second link. The self-NAV may be set in a link (e.g., second link) belonging to an NSTR link pair with the first link when there is a frame to be received in the first link as well as the beacon frame.

The size of the critical update flag may be 1 bit. The critical update flag may inform whether parameters changed in any link(s) among multiple links exist. In other words, the critical update flag may inform whether parameters have been changed in which link(s) among multiple links. The critical update flag may indicate whether changed parameters exist through a change sequence. The critical update flag may be associated with a change sequence. The change sequence may be referred to as a 'change counter'. The change sequence (i.e., the value of the change sequence) may increase each time the parameters are changed. The change sequence may indicate a version of the parameters. The AP identifier or the BSS identifier may be included in the frame together with the critical update flag. The AP identifier or BSS identifier may be included to indicate which link's parameters have been changed. In other words, since an AP responsible for each link is allocated (mapped) and the AP is responsible for one BSS, the link may be identified through the AP identifier or the BSS identifier.

The AP MLD may transmit the critical update flag in the second link and may transmit the beacon frame and/or probe response frame including the change sequence in the first link. When the parameters are changed, a value of the change sequence may increase than a value of the previous change sequence (e.g., the change sequence associated with the unchanged parameters). The critical update flag may include information indicating a link whose parameters have been changed (e.g., link identifier, AP identifier, BSS identifier).

When the critical update flag is received in the second link (e.g., when the critical update flag indicates that the parameters have been changed), the STA MLD may obtain the change sequence by receiving the beacon frame and/or the probe response frame in the first link. When the change sequence is received from the AP MLD, the STA MLD may compare the received change sequence with the change sequence stored in the STA MLD and may determine whether the parameters have been changed based on a result of the comparison. For example, if the received change sequence is the same as the change sequence stored in the STA MLD, the STA MLD may determine that the parameters have not been changed. When the received change sequence is different from the change sequence stored in the STA MLD, the STA MLD may determine that the parameters have been changed. In this case, the STA MLD may perform a parameter update operation based on the parameters received from the AP MLD.

The AP MLD may transmit information indicating the changed parameters to the STA MLD. In this case, the STA MLD may perform an update operation on the specific parameters indicated by the AP MLD. The types of the parameter may include Enhanced Distributed Channel Access (EDCA) parameters, High Throughput (HT) operation parameters, Very High Throughput (VHT) operation parameters, High Efficiency (HE) operation parameters, Extremely High Throughput (EHT) operation parameters, Direct Sequence Spread Spectrum (DSS) parameter set, and the like. When the AP MLD indicates that the EHT operation parameters have been changed, the STA MLD may perform an update operation on the EHT operation parameters.

Meanwhile, the STA MLD may configure the first link as a primary link, and the STA1 of the STA MLD may be configured to perform a beacon frame reception operation in the first link. In this case, if the STA1 of the STA MLD does not support STR operations, a self-NAV may be set in the second link during a preset beacon transmission period (TBTT) in the first link. Since a frame transmission operation is not performed in the second link in which the self-NAV is set, the STA1 of the STA MLD may receive a beacon frame in the first link. The STA2 of the STA MLD performing a transmission operation in the second link may adjust a length of a PPDU so that the transmission operation is terminated before a start time of the self-NAV. When reception of a beacon frame is scheduled in the first link and setting of a self-NAV is scheduled for the second link for reception of the beacon frame in the first link, the STA2 of the STA MLD may succeed in a channel access operation (e.g., channel sensing operation, backoff operation) in the second link before the start time of the self-NAV. In this case, after the STA MLD succeeds in the channel access operation for PPDU transmission in the second link, the STA MLD may wait for the PPDU transmission until the self-NAV is terminated without the PPDU transmission. After receiving the beacon frame in the first link, the STA MLD may immediately start a transmission operation in the second link without performing a channel access operation again.

Figure 6:
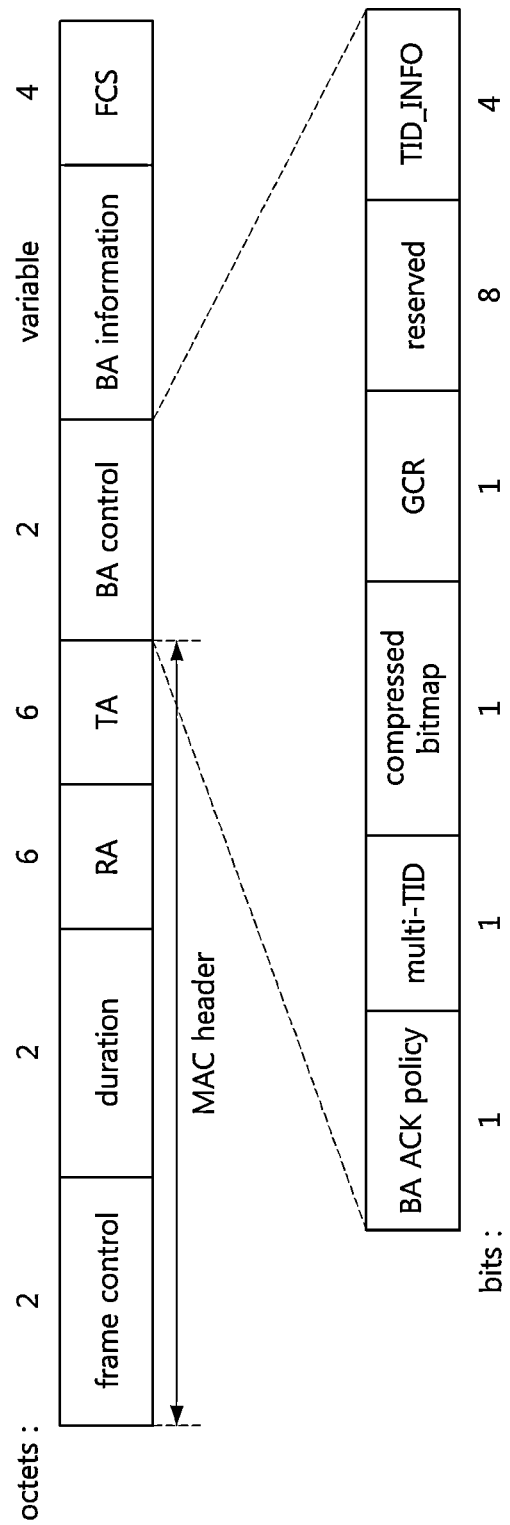
FIG. 6 is a block diagram illustrating a first embodiment of a BA frame including information indicating whether parameters have been changed.

FIG. 6 is a block diagram illustrating a first embodiment of a BA frame including information indicating whether parameters have been changed.

As shown in FIG. 6, a critical update flag (e.g., information indicating whether parameter(s) have been changed) may be indicated by information included in a header of a BA frame. For example, a value of a duration field included in the header may be set longer than a transmission time of the corresponding BA frame. The duration field indicating a time longer than the transmission time of the BA frame may indicate that the parameter(s) have been changed. In other words, the duration field may function as the critical update flag and may indicate that a frame including the changed parameters is to be transmitted after the BA frame is transmitted. The time longer than the transmission time of the BA frame (e.g., the value of the duration field) may be set to 'transmission time of the BA frame+short interframe space (SIFS)+transmission time of the frame including the changed parameters'. Alternatively, the time longer than the transmission time of the BA frame (e.g., the value of the duration field) may be set to be less than or equal to 'transmission time of the BA frame+1 slot time'. In this case, an additional channel contention operation may be performed for transmission of the frame including the changed parameters. TID information may be used to indicate a link whose parameters have been changed. Since the TID is mapped to the link, the link mapped to the TID may be identified based on a mapping relationship between the TID and the link. Among them, the parameters of one link are changed. Alternatively, an AP identifier, a BSS identifier, or a link identifier may be inserted and transmitted by putting an additional information element in BA information.

Alternatively, reserved bit(s) in the BA frame (e.g., BA control field included in the BA frame) may be configured as the critical update flag. One reserved bit in the BA frame may be used, and in this case, one reserved bit may indicate whether the parameters have been changed. Alternatively, a plurality of reserved bits in the BA frame may be used, and in this case, the plurality of reserved bits may indicate the changed parameters. The plurality of reserved bits may be configured in a form of a bitmap. For example, when three reserved bits are used, the first reserved bit may indicate whether the VHT operation parameters have been changed, the second reserved bit may indicate whether the HE operation parameters have been changed, and the third reserved bit may indicate whether the EHT operation parameters have been changed. A link whose parameters have been changed may be identified based on an identifier (e.g., AP identifier, BSS identifier, or link identifier) included in the TID information or the BA information.

Figure 7:
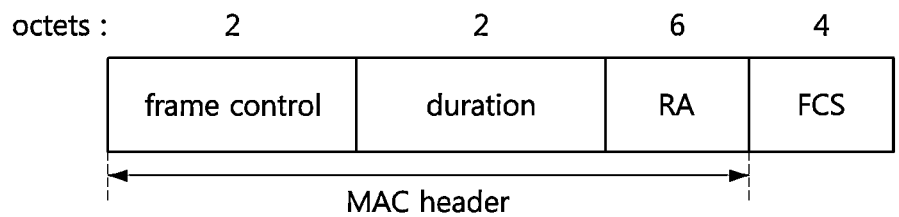
FIG. 7 is a block diagram illustrating a first embodiment of an ACK frame including information indicating whether parameters have been changed.

FIG. 7 is a block diagram illustrating a first embodiment of an ACK frame including information indicating whether parameters have been changed.

As shown in FIG. 7, a critical update flag (e.g., information indicating whether parameters have been changed) may be indicated by information included in a header of an ACK frame. For example, a value of a duration field included in the header may be set longer than a transmission time of the corresponding ACK frame. The duration field indicating the time longer than the transmission time of the ACK frame may indicate that the parameters have been changed. In other words, the duration field may function as the critical update flag and may indicate that a frame including the changed parameters is to be transmitted after the ACK frame. The time longer than the transmission time of the ACK frame (e.g., the value of the duration field) may be set to 'transmission time of the ACK frame+SIFS+transmission time of the frame including the changed parameters'. Alternatively, the time longer than the transmission time of the ACK frame (e.g., the value of the duration field) may be set to be less than or equal to 'transmission time of the ACK frame+1 slot time'. In this case, an additional channel access operation may be performed for transmission of the frame including the changed parameters. In the case of the ACK frame, the transmission time indicating the parameter change may be set differently for each link, so that the link can be identified. For example, if the number of supported links is four, the time may be added to identify the link as a result of (added time modulo 4) operation.

Figure 8:
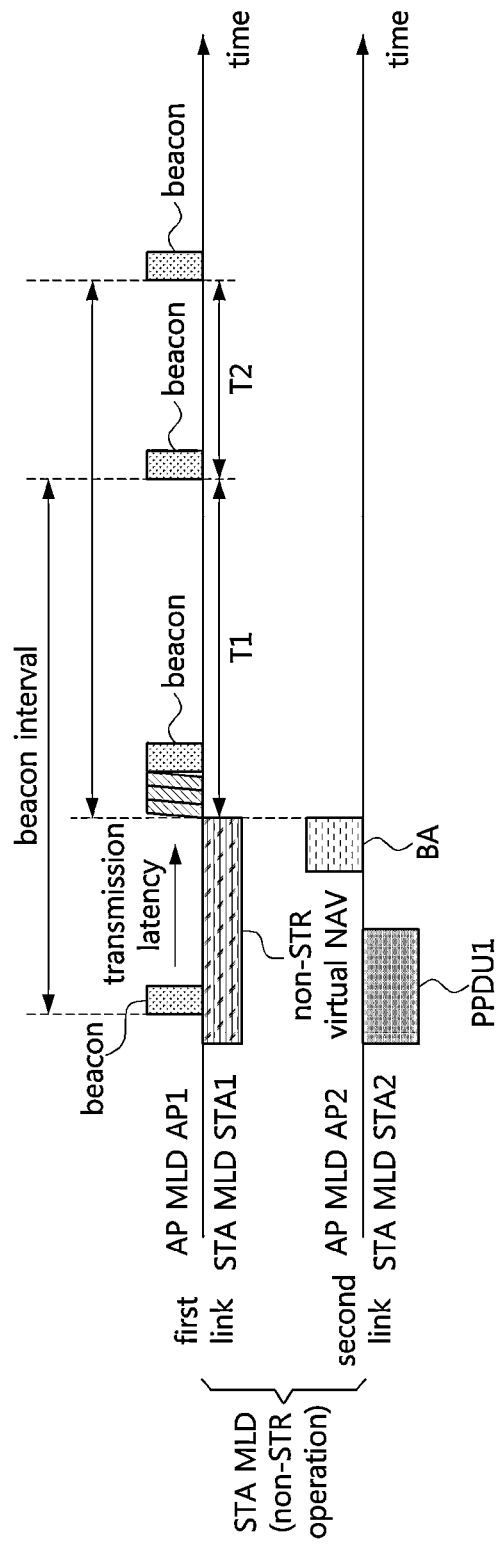
FIG. 8 is a timing diagram illustrating a second embodiment of a method for updating parameters in a wireless LAN system supporting a multi-link.

FIG. 8 is a timing diagram illustrating a second embodiment of a method for updating parameters in a wireless LAN system supporting a multi-link.

As shown in FIG. 8, when a STA MLD that does not support STR operations performs a transmission operation in one link, a beacon frame (hereinafter, referred to as an 'update beacon frame') including changed parameters may be transmitted after the above-described transmission operation. The transmission operation may be performed in the second link, and the update beacon frame may be transmitted/received in the first link. In this case, the STA MLD may receive the update beacon frame in the first link after the transmission operation in the second link ends.

The AP MLD may transmit the update beacon frame after a SIFS or point coordination function (PCF) interframe space (PIFS) from a specific time. Alternatively, the AP MLD may perform a backoff operation after a SIFS or PIFS from the specific time and may transmit the update beacon frame when the backoff operation is completed. In other words, transmission of the update beacon frame may be delayed. The specific time may be an end time of the transmission operation (e.g., a reception completion time of a BA frame (or ACK frame) for a PPUD1) in the second link of the STA MLD (e.g., STA2). The update beacon frame may have a higher priority than a frame to which a longer time (e.g., DIFS or arbitration interframe space (AIFS)) than a SIFS or PIFS is applied.

If a transmission delay of the delayed update beacon frame is T2, and a time from an end time of the transmission delay to the next beacon transmission period (TBTT) when the beacon frame is transmitted without the transmission delay is T1, the beacon transmission period (TBTT) in which the delayed update beacon frame is transmitted may be T1+T2. In this case, the TBTT (e.g., T1+T2) may be a time excluding an execution time of the channel access operation. Alternatively, since only the transmission of the current update beacon frame is exceptionally delayed, a TBTT indicated by information included in the subsequent beacon frame may be T2. In this case, one beacon frame after the delayed beacon frame may be transmitted quickly, and then the beacon frame may be transmitted according to an originally scheduled beacon transmission period.

The AP MLD may set a non-STR virtual NAV for the transmission delay of the update beacon frame. Since the STA1 of the STA MLD cannot receive in the first link while the STA2 of the STA MLD that does not support STR operations performs a transmission operation for the STA MLD in the second link, the non-STR virtual NAV may be set to delay frame transmission to the STA1 of the STA MLD in the first link during the corresponding period. In other words, the non-STR virtual NAV may be used so that frame transmission to the STA1 of the STA MLD is guaranteed not to be performed in the first link during the time for the STA2 of the STA MLD to perform the transmission for the STA MLD in the second link. The non-STR virtual NAV may be set in the first link based on a frame (e.g., PPDU1) transmitted by the STA2 of the STA MLD in the second link.

For example, the STA2 of the STA MLD may transmit a PPDU1 in the second link, and the AP2 of the AP MLD may receive the PPDU1 in the second link. The AP MLD may identify that the STA MLD does not support STR operations during an initial access process. Therefore, when the PPDU1 is received from the STA2 of the STA MLD that does not support STR operations, the AP MLD may set a non-STR virtual NAV not to transmit a frame to a STA in charge of another link of the STA MLD during a transmission time of the PPDU1. The AP MLD may identify that the STA that transmitted the PPDU1 does not support STR operations and the transmission time of the PPDU1 based on a value of a duration field included in the PPDU1, an address of a transmitter that transmitted the PPDU1 and/or a length value of a preamble. In this case, the AP MLD may set a non-STR virtual NAVs for other STAs in charge of other links of the STA MLD for the duration. When the duration of the PPDU1 includes a reception time of a BA frame, the non-STR virtual NAV may be set only for the transmission time of the PPDU1. The transmission time of the PPDU1 may be identified based on a length parameter (e.g., 12 bits) included in a signal field of the preamble of the PPDU1. When the AP1 of the AP MLD sets a non-STR virtual NAV for the STA1 of the STA MLD in the first link, in a time period corresponding to the non-STR virtual NAV in the first link, the AP1 of the AP MLD may perform a transmission to other communication nodes but may not perform a transmission operation to the STA1 of the STA MLD. When a packet to be transmitted to the STA1 of the STA MLD occurs in the period for which the non-STR virtual NAV is set, the packet may be transmitted after the period for which the non-STR virtual NAV is set ends. In other words, the transmission of the packet may be delayed.

The non-STR virtual NAV may be set for each STA of the STA MLD that does not support STR operations. The setting information of the non-STR virtual NAV may include an identifier of the STA (e.g., MAC address, association identifier (AID), or the like) to which a NAV timer and/or the non-STR virtual NAV is applied. For example, a non-STR virtual NAV for the STA1 of the STA MLD may be set independently of a non-STR virtual NAV for the STA2 of the STA MLD. When a non-STR virtual NAV is set, the following transmission operation(s) may be prohibited to the STA to which the non-STR virtual NAV is applied in a time period corresponding to the non-STR virtual NAV.

Unicast transmission operation: transmission operation of a frame having a receiver address (e.g., destination address) indicating a STA for which the non-STR virtual NAV is set.

Multicast transmission operation: transmission operation of a frame having a receiver address (e.g., destination address) indicating a multicast group to which a STA for which the non-STR virtual NAV is set belongs.

Broadcast transmission operation: All frames transmitted in a broadcast scheme.

Figure 9:
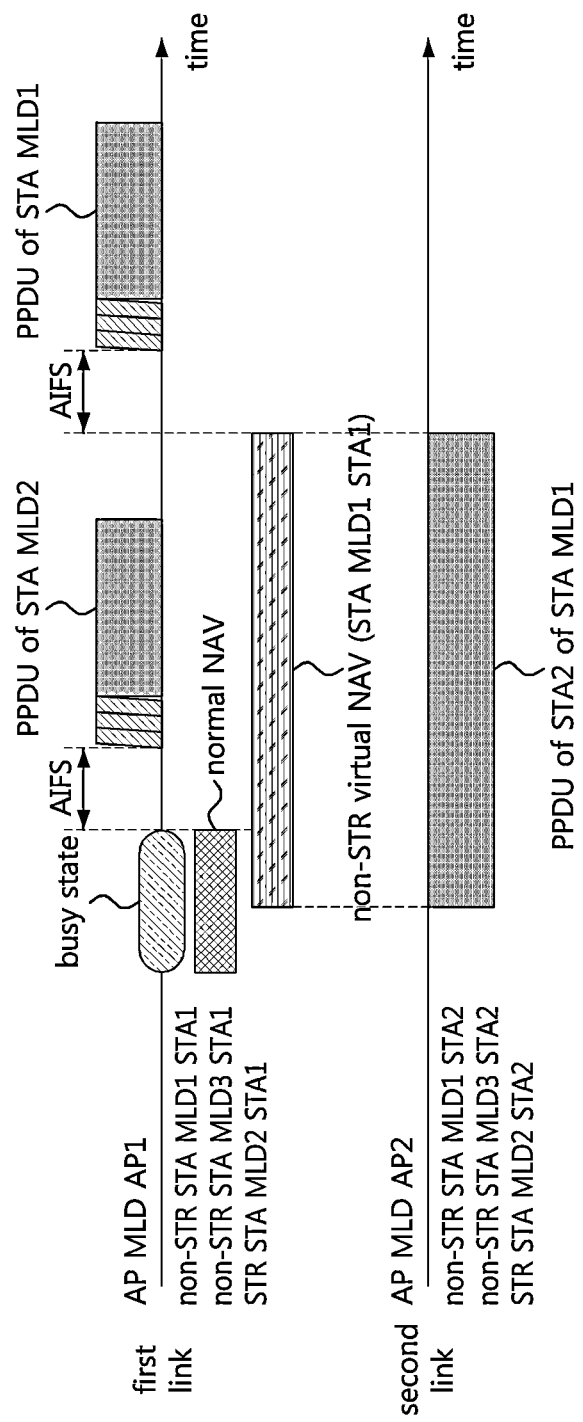
FIG. 9 is a timing diagram illustrating a first embodiment of a method for setting a non-simultaneous transmit and receive (non-STR) virtual network allocation vector (NAV) in a wireless LAN system supporting a multi-link.

FIG. 9 is a timing diagram illustrating a first embodiment of a method for setting a non-STR virtual NAV in a wireless LAN system supporting a multi-link.

As shown in FIG. 9, as a method for a STA MLD (e.g., the STA1 of the STR STA MLD2) or AP MLD (e.g., the AP1 of the AP MLD) to set a non-STR virtual NAV, a STA (e.g., STA2 of the STA MLD1) of the STA MLD that does not support STR operations may set a non-STR virtual NAV in a STA (e.g., STA1 of the STA MLD1) in charge of another link of the STA MLD not supporting STR operations based on information (e.g., duration, transmitter address, a length value of a preamble) included in a header of a frame transmitted in a specific link. When the non-STR virtual NAV is set, the STA MLD (e.g., the STA1 of the STR STA MLD2) or AP MLD (e.g., the AP1 of the AP MLD) may not perform a frame transmission operation to the STA (e.g., STA1 of the STA MLD1) to which the non-STR virtual NAV is applied in a time period corresponding to the non-STR virtual NAV. In this case, a collision between frames transmitted by other STAs of the STA MLD affiliated with the STA to which the non-STR virtual NAV is applied may not occur. For example, when a frame is transmitted in the second link, and when an STR operation is not supported in the first link and the second link, the non-STR virtual NAV may be set based on a value of a duration field included in a header of a frame transmitted in the second link, transmitter address, and/or the length value of the preamble so that a frame is not transmitted to the STA in charge of the first link in the STA MLD for a duration or a length of the preamble in the first link with respect to the STA in charge of the first link of the STA MLD (e.g., STA MLD affiliated with the STA corresponding to the transmitter address) transmitting a frame in the second link.

The STA MLD1 that does not support STR operations may transmit a frame (e.g., PPDU) in the second link when the first link is occupied. The AP2 of the AP MLD may receive the frame of the STA2 of the STA MLD1 in the second link. The AP MLD may identify the STA MLD1 of the STA2 based on the transmitter address of the frame transmitted by the STA2 of the STA MLD1 and information registered at the time of initial access. The AP MLD may identify whether the STA MLD1 supports STR functions and/or whether the first link (i.e., STA1) and the second link (i.e., STA2) are an NSTR pair by referring to capability registered by the STA MLD1 in the AP MLD. After identifying that the STA MLD1 cannot perform STR operations in the first link (i.e., STA1) and the second link (i.e., STA2), the AP MLD may set a non-STR virtual NAV for prohibiting frame transmission to the STA1 of the STA MLD1 for a duration or a length of the preamble based on a value of a duration field or the length of the preamble included in a header of a frame of the STA1 of the STA MLD1 received in the second link.

The non-STR virtual NAV may be set together with another NAV (e.g., normal NAV). The AP1 of the AP MLD may set a normal NAV in the first link, and may set a non-STR virtual NAV in the first link independently of the normal NAV. The non-STR virtual NAV may be set for the STA1 of the STA MLD1 in the first link based on a value of a duration field or a length value of a preamble included in a header of a frame transmitted by the STA2 of the STA MLD1 in the second link.

If there is a frame (e.g., PPDU) to be transmitted to the STA MLD2 after an end of the normal NAV, since the non-STR virtual NAV is not applied to the STA MLD2, the AP1 of the AP MLD may transmit a frame to the STA1 of the STA MLD2 in the first link even in the period to which the non-STR virtual NAV is applied. The frame from the STA MLD2 to the STA1 may be transmitted according to a channel contention operation. The frame for the STA MLD1 may be transmitted after an end of the non-STR virtual NAV applied to the STA1 of the STA MLD1. For example, the AP1 of the AP MLD may perform a channel contention operation in the first link after the end of the non-STR virtual NAV. Also, if the channel contention operation succeeds, the AP1 of the AP MLD may transmit a frame (i.e., PPUD of the STA MLD1) to the STA MLD1. When direct communication (e.g., peer-to-peer (P2P) communication) between the STA MLDs is performed, other STA MLDs receiving the frame of the STA MLD1 may set a non-STR virtual NAV applied to the STA MLD1.

If whether STR operations are supported or/and an NSTR link pair relationship is not identified by the previously registered information, the link for which the non-STR virtual NAV is set may be identified based on the value of the duration field. A link that does not support STR operations may be identified based on a result of a modulo operation between the value of the duration field and a slot time. For example, a modulo operation may be performed on the value of the duration field and the slot time (e.g., 9 µs). A link to which the non-STR virtual NAV is applied may be determined as shown in Table 1 below according to the result of the modulo operation.

TABLE 1

| A result of a modulo operation | Operation |
|---|---|
| 0 | 0 may indicate that the STA MLD supports STR operations. It is unnecessary to set a non-STR virtual NAV. |
| 1 | 1 may indicate that STR operations are not supported by all links. Non-STR virtual NAV may be set in all links. |
| n (i.e., natural number of 2 or more) | n may indicate that STR operations are not supported in a link #n-1. Non-STR virtual NAV may be set in the link #n-1. |

The length of the non-STR virtual NAV may be set as 'the value of the duration field—the result of the modulo operation'. For example, when the slot time is 9 μs and the value of the duration field is 452 μs, since a result of (452 mod 9) is 2, the STR operation may not be supported in the link #1 (e.g., the first link). Accordingly, the non-STR virtual NAV may be set in the link #1, and in this case, the length of the non-STR virtual NAV may be 450 μs.

When the number of links available in the AP MLD is 4 or less, whether to set a non-STR virtual NAV in each of the links in which transmission is not performed may be indicated in form of a bitmap. For example, the STA MLD may transmit a frame in the link #2, and a value of a duration field included in the frame may be 453 μs. In this case, since a result of (453 mod 90) is 3 and a binary number of 3 is '101', the non-STR virtual NAV may be set in the link #1 and the link #3, and the non-STR virtual NAV may not be set in the link #4. When an aggregated (A)-MPDU is transmitted, information on link(s) having a non-STR relationship may be transmitted. The A-MPDU may include a plurality of MPDUs, and a MAC header of each of the plurality of MPDUs may include information on link(s) having a non-STR relationship as in the above-described method.

A frame including information indicating setting of the above-described non-STR virtual NAV may be transmitted. When a frame including the information indicating the setting of the non-STR virtual NAV is received, the communication node (e.g., AP MLD or STA MLD) may identify a link, a duration, and an STA of a target STA MLD to which the non-STR virtual NAV associated with the frame is set and may immediately set the non-STR virtual NAV for the STA of the STA MLD in the corresponding link. In other words, since the setting information of the non-STR virtual NAV is included in the frame header, the non-STR virtual NAV may be set in another link based on the decoding result of the header. In this case, when the AP MLD or the STA MLD is transmitting a frame to a communication node in which the non-STR virtual NAV is set, the transmission operation of the corresponding frame may be stopped.

Figure 10:
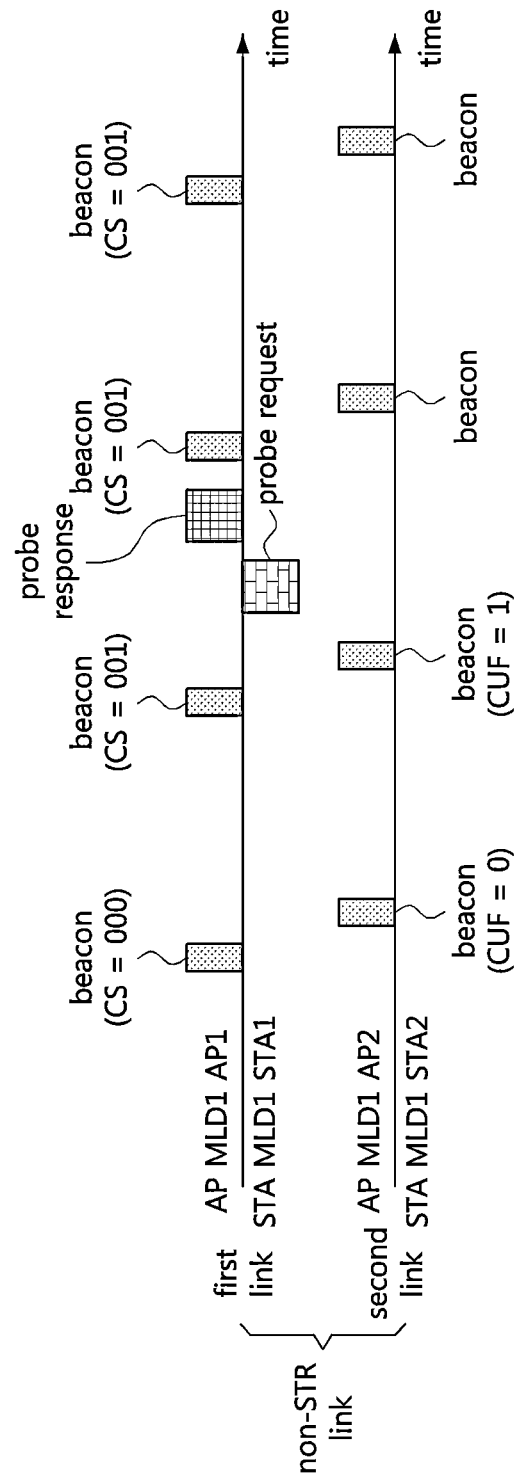
FIG. 10 is a timing diagram illustrating a third embodiment of a method for updating parameters in a wireless LAN system supporting a multi-link.
Figure 11:
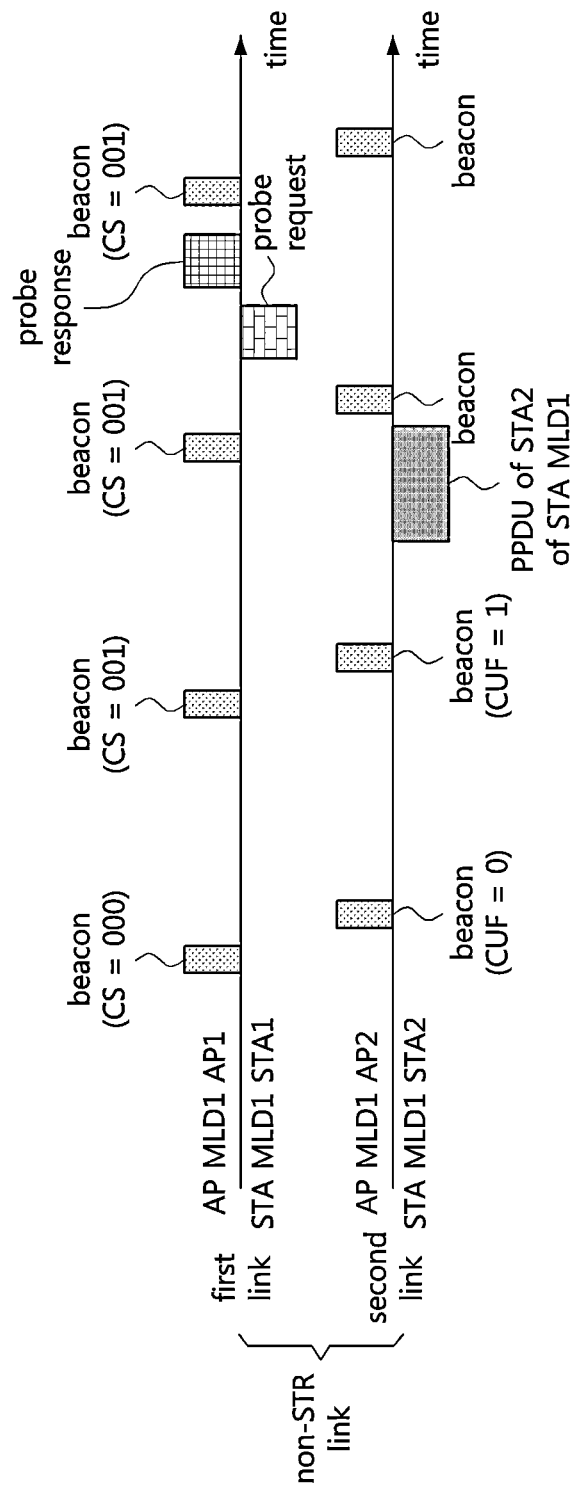
FIG. 11 is a timing diagram illustrating a fourth embodiment of a method for updating parameters in a wireless LAN system supporting a multi-link.
Figure 12:
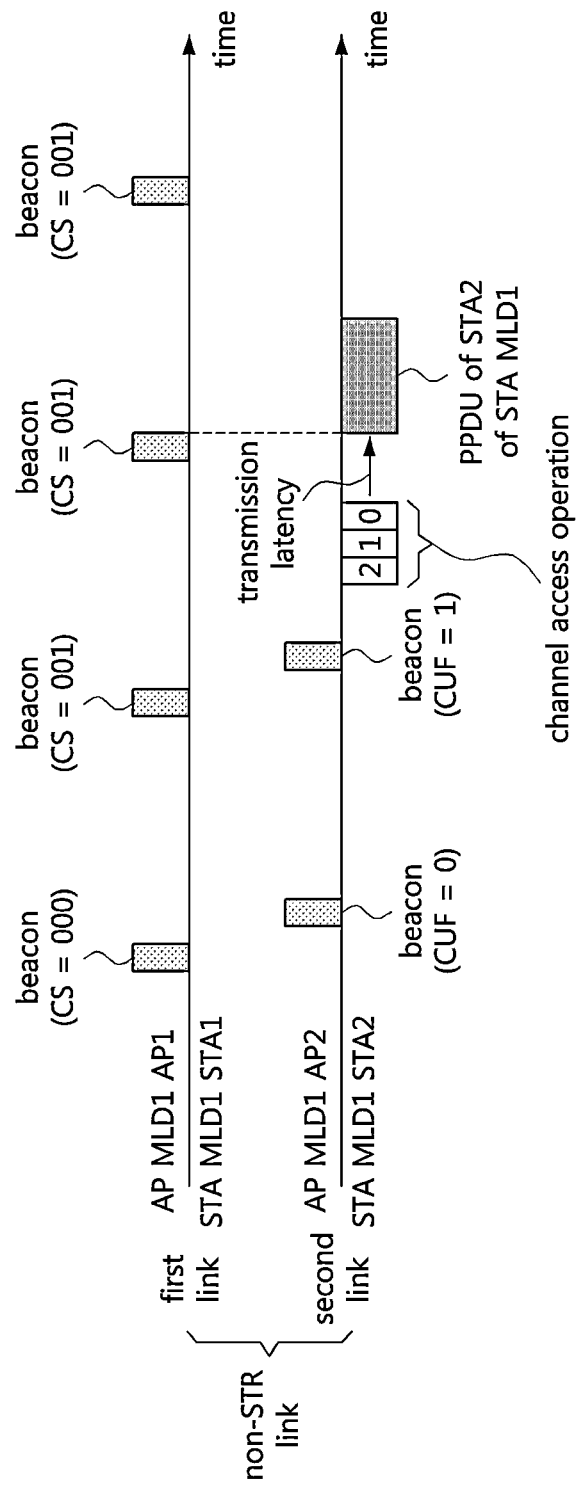
FIG. 12 is a timing diagram illustrating a fifth embodiment of a method for updating parameters in a wireless LAN system supporting a multi-link.

Meanwhile, the parameter(s) may be updated according to the following embodiments (e.g., embodiments shown in FIGS. 10 to 12). In the following embodiments, a CS may mean a change sequence, a CC may mean a change counter, and a CUF may mean a critical update flag.

FIG. 10 is a timing diagram illustrating a third embodiment of a method for updating parameters in a wireless LAN system supporting a multi-link.

As shown in FIG. 10, information indicating whether parameters for the first link have been changed (e.g., critical update flag) may be transmitted/received in the second link. Also, the changed parameters for the first link may be transmitted and received in the first link. The AP MLD1 and the STA MLD1 may use two links (e.g., the first link and the second link). When the parameter(s) for the first link have been changed, the AP1 of the AP MLD1 may increase the change sequence (e.g., change counter) by 1 and transmit a beacon frame including the incremented change sequence. After the parameters are changed, the AP2 of the AP MLD1 may transmit a beacon frame including the critical update flag (e.g., critical update flag set to 1) indicating that the parameters have been changed in the second link. The STA2 of the STA MLD1 may receive the beacon frame in the second link. When the critical update flag included in the beacon frame is set to 1, the STA2 of the STA MLD1 may determine that the parameters (e.g., parameter for the first link) have been changed.

When the critical update flag is identified, the STA1 of the STA MLD1 may not receive a frame (e.g., beacon frame) including the changed parameter(s) in the first link. In this case, the STA1 of the STA MLD1 may transmit a probe request frame in the first link to receive the changed parameter(s). The probe request frame may include information requesting transmission of the changed parameter(s) and/or a change sequence stored in the STA1. The AP1 of the AP MLD1 may receive the probe request frame from the STA MLD1 in the first link. When the probe request frame is received, the AP1 of the AP MLD1 may determine that transmission of the changed parameter(s) is requested. Accordingly, the AP1 of the AP MLD1 may transmit a probe response frame including the changed parameter(s) in the first link. For example, if the change sequence of the STA1 included in the probe request frame is different from the current change sequence (e.g., the change sequence associated with the updated parameters), the AP1 of the AP MLD1 may transmit the probe response frame including the changed parameter(s) to the STA MLD1. The STA1 of the STA MLD1 may receive the probe response frame from the AP1 of the AP MLD1 in the first link and may update parameters based on the information included in the probe response frame.

The STA MLD1 may simultaneously perform channel access procedures in the first link and the second link in order to transmit the probe request frame, and the channel access procedure may succeed in the second link before the first link. In this case, the STA2 of the STA MLD1 may transmit a probe request frame requesting transmission of the changed parameters to the AP1 of the AP MLD1 in the second link. The probe request frame transmitted in the second link may include information (e.g., link identifier) requesting to transmit the parameters for the first link. The AP2 of the AP MLD1 may receive the probe request frame from the STA2 of the STA MLD1 in the second link. The AP2 of the AP MLD1 may identify that transmission of the parameters for the first link is requested based on the information (e.g., link identifier, AP identifier, or BSS identifier) included in the probe request frame. In this case, the AP MLD1 (e.g., AP1 and/or AP2) may transmit a frame including the changed parameters to the STA MLD1.

On the other hand, after transmitting and receiving the above-described probe request/response frame, the STA1 of the STA MLD1 may receive the beacon message in the first link and may compare the change sequence included in the received beacon message with the previous change sequence (e.g., change sequence stored in the STA1). When the change sequence included in the received beacon message is different from the previous change sequence, the STA1 of the STA MLD1 may determine that the parameters have been changed and may perform a parameter update operation. This operation may be performed when the changed parameters are not obtained from the probe response frame.

A separate information request frame may be used instead of the aforementioned probe request frame and a separate information response frame may be used instead of the aforementioned probe response frame.

FIG. 11 is a timing diagram illustrating a fourth embodiment of a method for updating parameters in a wireless LAN system supporting a multi-link.

As shown in FIG. 11, information indicating whether parameters for the first link have been changed (e.g., critical update flag) may be transmitted/received in the second link. Also, the changed parameters for the first link may be transmitted/received in the first link. The AP2 of the AP MLD1 may transmit a beacon frame including the critical update flag in the second link. The STA2 of the STA MLD1 may receive the beacon frame in the second link and may identify the critical update flag included in the beacon frame. When the critical update flag indicates that the parameters for the first link have been changed (e.g., when the critical update flag is set to 1), the STA MLD1 may perform an operation of receiving a frame (e.g., beacon frame or probe response frame) including the changed parameters in the first link for parameter update.

The STA MLD1 that does not support STR operations may transmit a data frame using the second link at the time of receiving the update beacon frame (e.g., beacon frame including the changed parameters). The STA MLD1 may not be able to perform a reception operation in the first link while transmitting the data frame in the second link. Accordingly, the STA MLD1 may not receive the beacon frame in the first link. A period in which a reception operation is not performed in the first link may be a deaf period.

The STA MLD1 may perform a channel access operation in the first link (or second link) in order to transmit a probe request frame after completing transmission of the data frame in the second link. When the channel is in an idle state, the STA MLD1 may transmit a probe request frame requesting transmission of the changed parameters in the first link. The AP MLD1 may receive the probe request frame in the first link and may determine that transmission of the changed parameters is requested. The AP MLD1 may transmit a probe response frame including the changed parameters in the first link. The STA MLD1 may receive the probe response frame in the first link and may update parameters based on information included in the probe response frame. If the parameters are not updated through the probe request/response message, the STA MLD1 may update the parameters by receiving a beacon frame in the next beacon transmission period of the first link.

FIG. 12 is a timing diagram illustrating a fifth embodiment of a method for updating parameters in a wireless LAN system supporting a multi-link.

As shown in FIG. 12, information indicating whether parameters for the first link have been changed (e.g., critical update flag) may be transmitted/received in the second link. Also, the changed parameters for the first link may be transmitted/received in the first link. The AP2 of the AP MLD1 may transmit a beacon frame including the critical update flag in the second link. The STA2 of the STA MLD1 may receive the beacon frame in the second link and may identify the critical update flag included in the beacon frame. When the critical update flag indicates that the parameters for the first link have been changed (e.g., when the critical update flag is set to 1), the STA MLD1 may perform an operation of receiving a frame (e.g., beacon frame or probe response frame) including the changed parameters in the first link for parameter update.

The STA MLD1 may be a non-STR STA MLD that does not support the STR operations and a data frame of the STA MLD1 may occur at the time of receiving an update beacon frame (e.g., beacon frame including the changed parameters). In this case, the STA2 of the STA MLD1 may perform a channel access operation in the second link to transmit the data frame and, when the channel access operation is completed, may delay transmission of the data frame to receive the update beacon frame in the first link.

The STA1 of the STA MLD1 may receive the update beacon frame in the first link and may update parameters based on information included in the update beacon frame. After receiving the update beacon frame, the STA2 of the STA MLD1 may transmit the data frame in the second link in which the channel access operation is completed.

The channel access operation may be determined to be successful if the channel is in an idle state for 'a channel sensing period+AIFS'. When the channel is in a busy state, the communication node may perform a backoff operation if the channel is in an idle state for an AIFS from an end time of the busy state. The communication node may determine that the channel access operation is successful when the backoff operation is successful.

The embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those having ordinary skill in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A method for operating a first device using multi-link in a wireless local area network, the method comprising:
    transmitting a first frame including an updated parameter used for a communication operation in a first link on the first link of the multi-link;
    transmitting, to a second device, a second frame first including information indicating that the updated parameter exists and second information including a count value for the updated parameter on a second link of the multi-link; and
    transmitting, to the second device, a third frame including the updated parameter on one link of the multi-link.

2. The method of claim 1, wherein
    the first device includes a first access point (AP) affiliated with the first device and includes a second AP affiliated with the first device,
    the first AP operates on the first link,
    the second AP operates on the second link,
    the second device includes a first station (STA) affiliated with the second device and includes a second STA affiliated with the second device,
    the first STA operates on the first link, and
    the second STA operates on the second link.

3. The method of claim 1, wherein each of the first frame and the second frame is a beacon frame, and the third frame is the beacon frame or a probe response frame.

4. The method of claim 3, wherein the beacon frame is transmitted to a plurality of devices including the second device based on a broadcast manner.

5. The method of claim 3, wherein the probe response frame is transmitted to a plurality of devices including the second device based on a broadcast manner or a unicast manner.

6. The method of claim 1, wherein, when the second device does not support a simultaneous transmit and receive (STR) operation in the multi-link and a frame is transmitted in the second link during a reception period of the first frame in the first link, the first frame is not received in the second device.

7. The method of claim 1, wherein the first frame and the second frame are transmitted periodically, and the third frame is transmitted according to periodicity or a request of the second device or another device.

8. The method of claim 1, wherein, in order to receive the third frame in the second device, transmission is prohibited during a period in which the third frame is transmitted on a link(s) other than a link through which the third frame is transmitted.

9. A method for operating a second device using multi-link in a wireless local area network, the method comprising:

receiving, from a first device, a first frame including first information indicating that an updated parameter used for a communication operation exists and second information including a count value for the updated parameter on a link other than a first link of the multi-link through the first link;

identifying that the updated parameter exists based on the first information and the second information included in the first frame; and receiving, from the first device, a second frame including the updated parameter in one link of the multi-link.

10. The method of claim 9, wherein the first device includes a first access point (AP) affiliated with the first device and includes a second AP affiliated with the first device, the first AP operates on the first link, the second AP operates on the second link, the second device includes a first station (STA) affiliated with the second device and includes a second STA affiliated with the second device, the first STA operates on the first link, and the second STA operates on the second link.

11. The method of claim 9, wherein the first frame is a beacon frame, and the second frame is the beacon frame or a probe response frame.

12. The method of claim 9, wherein the first frame is transmitted periodically, and the second frame is transmitted according to periodicity or a request of the second device or other device.

13. The method of claim 9, wherein, in order to ensure reception of the second frame in the second device, transmission is prohibited during a period in which the second frame is transmitted on a link(s) other than a link through which the second frame is transmitted.

14. The operation method according to method of claim 9, further comprising:

performing a channel access operation for transmission of a frame in the one link; and when the channel access operation is completed, delaying the transmission of the frame to receive the second frame including the updated parameter.

15. A first device using multi-link in a wireless local area network, the first device comprising a processor configured to:

transmit a first frame including an updated parameter used for a communication operation in a first link through the first link of the multi-link;

transmit, to a second device, a second frame including first information indicating that the updated parameter exists and second information including a count value for the updated parameter on a second link of the multi-link; and transmit, to the second device, a third frame including the updated parameter on one link of the multi-link.

16. The first device according to claim 15, wherein the first device includes a first access point (AP) affiliated with the first device and includes a second AP affiliated with the first device, the first AP operates on the first link, the second AP operates on the second link, the second device includes a first station (STA) affiliated with the second device and includes a second STA affiliated with the second device, the first STA operates on the first link, and the second STA operates on the second link.

17. The first device according to claim 15, wherein each of the first frame and the second frame is a beacon frame, and wherein the third frame is the beacon frame or a probe response frame.

18. The first device according to claim 15, wherein, when the second device does not support a simultaneous transmit and receive (STR) operation in the multi-link and a frame is transmitted in the second link during a reception period of the first frame in the first link, the first frame is not received in the second device.

19. The first device according to claim 15, wherein the first frame and the second frame are transmitted periodically, and the third frame is transmitted according to periodicity or a request of the second device or another device.

20. The first device according to claim 15, wherein, in order to ensure reception of the third frame in the second device, transmission is prohibited during a period in which the third frame is transmitted on one or more links other than a link through which the third frame is transmitted.

* * * * *